US009294274B2

(12) United States Patent
Smith

(10) Patent No.: US 9,294,274 B2
(45) Date of Patent: Mar. 22, 2016

(54) TECHNOLOGIES FOR SYNCHRONIZING AND RESTORING REFERENCE TEMPLATES

(71) Applicant: Intel Corporation, Santa Clara, CA (US)

(72) Inventor: Ned M. Smith, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 26 days.

(21) Appl. No.: 14/128,040

(22) PCT Filed: Sep. 19, 2013

(86) PCT No.: PCT/US2013/060695
§ 371 (c)(1),
(2) Date: Dec. 20, 2013

(87) PCT Pub. No.: WO2015/041658
PCT Pub. Date: Mar. 26, 2015

(65) Prior Publication Data
US 2015/0082024 A1    Mar. 19, 2015

(51) Int. Cl.
*H04L 9/08* (2006.01)
*H04L 29/08* (2006.01)
*H04L 29/06* (2006.01)

(52) U.S. Cl.
CPC .......... *H04L 9/0866* (2013.01); *H04L 63/0428* (2013.01); *H04L 63/0861* (2013.01); *H04L 67/10* (2013.01)

(58) Field of Classification Search
CPC ................................ H04L 29/06; H04L 63/10

USPC ......................................................... 713/155
See application file for complete search history.

(56) References Cited

U.S. PATENT DOCUMENTS

| 6,256,737 | B1 | 7/2001 | Bianco et al. | |
|---|---|---|---|---|
| 2006/0136744 | A1* | 6/2006 | Lange | 713/186 |
| 2007/0094509 | A1 | 4/2007 | Wei et al. | |
| 2008/0022122 | A1* | 1/2008 | Parkinson et al. | 713/185 |
| 2009/0031125 | A1 | 1/2009 | Bjorn | |
| 2009/0271634 | A1* | 10/2009 | Boult et al. | 713/186 |
| 2010/0205431 | A1 | 8/2010 | Griffin | |
| 2013/0238908 | A1 | 9/2013 | Pizano | |

OTHER PUBLICATIONS

Fernando Alonso-Fernandez; Secure Access System Using Signature Verification over Tablet PC; IEEE; Apr. 2007; p. 1-6.*

(Continued)

*Primary Examiner* — Monjour Rahim
(74) *Attorney, Agent, or Firm* — Trop, Pruner & Hu, P.C.

(57) ABSTRACT

Generally, this disclosure describes technologies for restoring and/or synchronizing templates such as biometric templates to/among one or more client devices. In some embodiments one or more client devices may register with a synchronization server and provide encrypted copies of their reference templates to the server. In a restoration operation, the synchronization server may provide an encrypted copy of a client's reference template(s) to the client, which may decrypt them in a protected environment. In a synchronization operation, the synchronization server may provide encrypted copy of a first client's template(s) to a plurality of second clients. The second clients may then decrypt the encrypted template(s) within a protected environment using an appropriate decryption key.

24 Claims, 6 Drawing Sheets

(56) References Cited

OTHER PUBLICATIONS

Smith, et al., "Technologies for Secure Storage and Use of Biometric Authentication Information", U.S. Appl. No. 13/995,247, filed Jun. 18, 2013, 50 pages.
International Searching Authority, "Notification of Transmittal of the International Search Report and the Written Opinion of the International Searching Authority," mailed Jun. 19, 2014, in International application No. PCT/US2013/060695.
Dirk Balfanz, "FIDO U2F Raw Message Formats", FIDO Alliance Proposed Standard, May 14, 2015, pp. 1-10, FIDO Alliance.
Rolf Lindemann, "FIDO Security Reference", FIDO Alliance Proposed Standard, May 14, 2015, pp. 1-30, FIDO Alliance.
Dirk Balfanz, "FIDO U2F Implementation Considerations", FIDO Alliance Proposed Standard, May 14, 2015, pp. 1-5, FIDO Alliance.
Dirk Balfanz, FIDO U2F Javascript API, FIDO Alliance Proposed Standard, May 14, 2015, pp. 1-7, FIDO Alliance.
Alexei Czeskis, "FIDO NFC Protocol Specification v1.0", FIDO Alliance Proposed Standard, May 14, 2015, pp. 1-5, FIDO Alliance.
Sampath Srinivas, "Universal 2nd Factor (U2F) Overview", FIDO Alliance Proposed Standard, May 14, 2015, pp. 1-5, FIDO Alliance.
Salah Machani, et al., "FIDO UAF Review Draft Spec Set", FIDO Alliance Proposed Standard, Dec. 8, 2014, pp. 1-202.

* cited by examiner

ND RESTORING REFERENCE TEMPLATES

TECHNOLOGIES FOR SYNCHRONIZING AND RESTORING REFERENCE TEMPLATES

FIELD

The present disclosure generally relates to authentication, and more particularly to technologies for synchronizing and restoring reference templates used in an authentication protocol.

BACKGROUND

Password misuse is often cited as a weak point in the security of computing platforms. The security industry is therefore considering other mechanisms for securing computing platforms, such as biometric authentication and security tokens. Although useful, existing biometric authentication protocols rely on biometric templates that include biometric information that may uniquely identify a user. Effective revocation of a reference template may be difficult, as it may require an individual to somehow alter his/her physical appearance. Security of biometric reference templates and the biometric information contained therein is therefore desirable.

Some biometric protocols rely on the use of biometric templates that are retained on one or more client devices that remain under control of a user. Although such protocols can improve the security of biometric templates, they may present challenges to user experience. For example, a user may control multiple client devices that are not equipped with the same biometric sensors. In such instances a user may need to individually use each client device to collect biometric information for inclusion in a biometric reference template stored thereon. This may hamper the user's experience with the protocol, and may result in the provisioning of inconsistent biometric templates among the user's various client devices. Even if the user controls multiple identical client devices, existing biometric protocols do not provide a convenient mechanism to securely restore biometric templates to a client device, and/or to synchronize biometric templates across multiple identical or different client devices.

Accordingly there remains a need in the art for biometric authentication technologies that maintain security of biometric templates while providing a convenient mechanism for restoring and/or synchronizing such templates. The technologies described herein aim to address one or more aspects of that need.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Figure 1A:
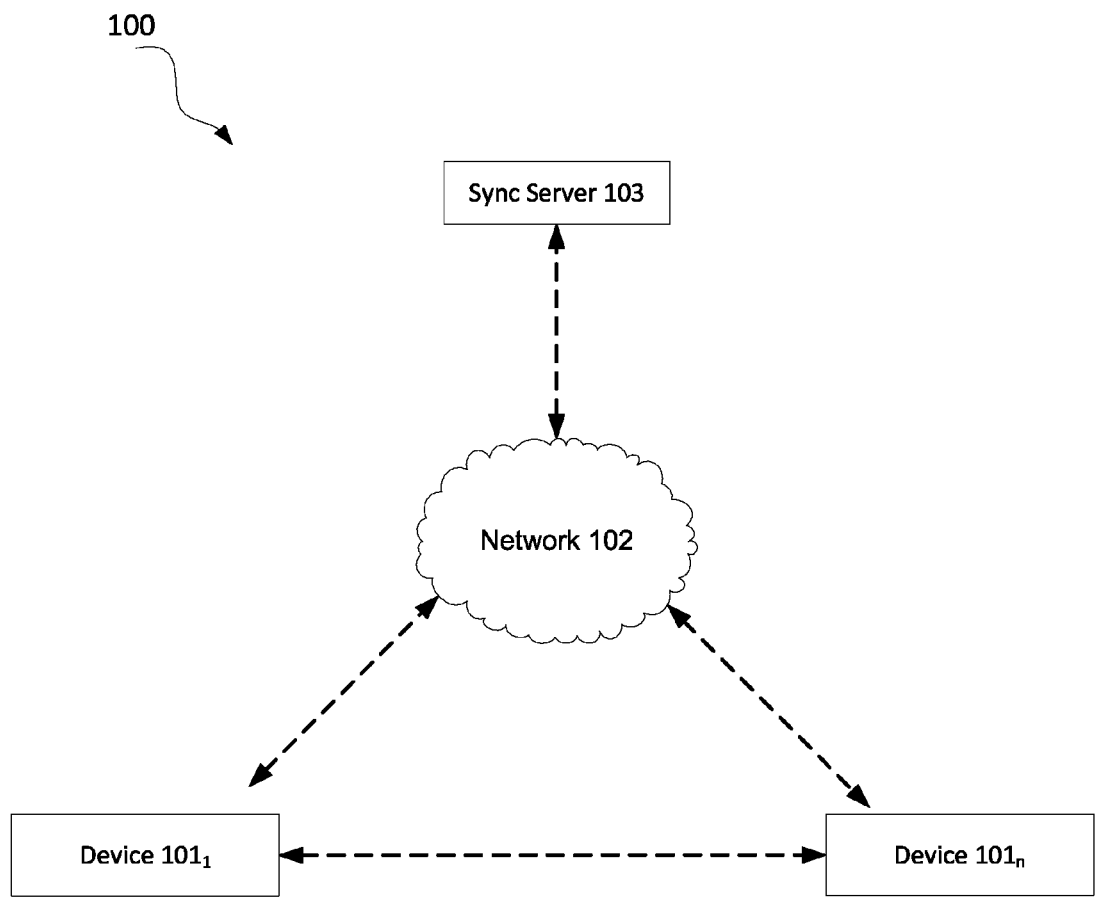
FIG. 1A illustrates an exemplary system level architecture for a synchronization and restoration system consistent with the present disclosure.

Although the following detailed description will proceed with reference being made to illustrative embodiments, many alternatives, modifications, and variations thereof will be apparent to those skilled in the art.

DETAILED DESCRIPTION

The present disclosure relates to authentication technology, including devices, systems and methods for securely synchronizing and restoring reference templates used in an authentication protocol, such as a biometric authentication protocol. In general, the technologies described herein leverage the use of protected environment (as defined below) on client devices (clients) to securely store authentication templates. Each client may perform device registration operations to register itself with a trusted synchronization device, referred to hereinafter as a "synchronization server" or "sync server." Based on a policy and/or content of a device registration signal, the sync server may assign each client device to one or more synchronization pools. Reference templates from one client device in a synchronization pool may be synchronized among other clients in the synchronization pool by executing a template synchronization operation. Likewise, templates may be restored to a client device by the sync server by executing a template restoration operation.

During or after device registration, all or a subset of the clients may perform template registration operations to register templates stored thereon with the sync server. For protection, plaintext of the templates may be stored within a protected environment of each client device, and may be encrypted by the client device prior to transmission to the sync server. Encryption of the templates (and optionally other information) may be performed using a sync wrapping key (SWK) and a suitable symmetric or asymmetric encryption protocol. During or after device and template registration, the sync server may be provisioned with device context for each client device, as well as an encrypted copy of each device's reference templates.

Each client device described herein may also be configured to exchange its sync wrapping keys with other client devices, e.g., in a synchronization pool. For example where first and second clients are in a synchronization pool, the first client may exchange its sync wrapping key ($SWK_1$) with the second client, and the second client may exchange its sync wrapping key ($SWK_2$) with the first client. For protection, the first and second client's may store the received sync wrapping keys in their respective protected environments. The first client may then encrypt $SWK_2$ with $SWK_1$, and the second client may encrypt $SWK_1$ with $SWK_2$. The resulting encrypted keys (\{$SWK_2$\}_$SWK_1$, \{$SWK_1$\}_$SWK_2$, where \{ \} denotes encryption) may then be sent to the sync server and stored in association with each client device and/or one or more synchronization pools. At this point the first and second client devices may be configured to delete the sync wrapping keys they received from one another. The first and second clients may alternatively or additionally store the sync wrapping keys they received from one another in their protected environments.

During a synchronization operation, encrypted keys may be transmitted by the sync server to each client device in a synchronization pool. For example, a sync server may send a first client device a copy or one or more keys that have been encrypted with the first client's SWK ($SWK_1$). Likewise, the sync server may send a second client device a copy of one or more keys that have been encrypted with the second client's SWK.

Once a client device and its templates have been registered with the synchronization server, restoration of the client device's templates and optionally other information may be conducted by executing a template restoration operation. During the restoration operation, the synchronization server may transmit a copy of the templates that were registered to it in connection with the client. The registered templates may be encrypted with the client's sync wrapping key (SWK), which the client may store and/or recalculate within its protected environment. The client may then decrypt the encrypted templates within its protected environment using its SWK.

Similarly, execution of a synchronization operation may enable the synchronization of reference templates among multiple client devices. As noted above the sync servers described herein may be configured to assign client devices to one or more synchronization pools. In such instances the execution of a synchronization operation may prompt the sync server to transmit a copy of one or more encrypted reference templates to clients within a particular synchronization pool. Thus for example where first and second clients are assigned to the same synchronization pool, execution of a synchronization operation may cause the sync server to transmit encrypted copies of the templates (and optionally other information) of the first client to the second client, templates of the second client to the first client, or a combination thereof. Of course any number of clients may be included in a synchronization pool, in which case biometric templates from a subset (e.g., 1, 2, etc.) or all of the clients in a synchronization pool may be transmitted to all or a subset of other clients within the synchronization pool. The templates to be transmitted and the client devices that are to receive such templates may be specified by a policy enforced by the sync server, in a synchronization request message, or a combination thereof.

As noted above each template registered on the sync server may be encrypted with a sync wrapping key (SWK) that is specific to the client that registered the template (hereinafter, an "originating client device" or "originating client"). Clients (and other devices) other than the originating client may be unable to decrypt and access the plaintext of reference templates received during a synchronization operation without the appropriate sync wrapping key. For example where a second client receives templates encrypted with a first client's sync wrapping key ($SWK_1$), the second client may be unable to decrypt the received reference templates without a copy of $SWK_1$.

To address this issue the sync servers described herein may be configured to transmit copies of encrypted keys associated with encrypted biometric information to one or more clients in a synchronization pool. For example in instances where a synchronization pool includes a first and second client, the sync server may store reference templates of the first client that are encrypted with the first client's SWK ($SWK_1$), as well as a copy of $SWK_1$ that is encrypted with $SWK_2$ ($\{SWK_1\}\_SWK_2$), as noted above. Pursuant to a device registration operation, the sync server may transmit a copy of the first client's encrypted templates as well as a copy of $\{SWK_1\}\_SWK_2$ to the second client. The second client may then use its sync wrapping key ($SWK_2$) to decrypt $SWK_1$ and then use $SWK_1$ to decrypt the encrypted reference templates, preferably within its protected environment.

The term "biometric information" is used herein to refer to observable physiological or behavioral traits of human beings (or other animals) that may be used to identify the presence of a human being (or other animal) and/or the identity of a specific human being (or other animal). Non-limiting examples of biometric information (factors) that may be used in accordance with the present disclosure include information regarding the biosignals (brain waves, cardiac signals, etc.), ear shape, eyes (e.g., iris, retina), deoxyribonucleic acid (DNA), face, finger/thumb prints, gait, hand geometry, handwriting, keystroke (i.e., typing patterns or characteristics), odor, skin texture, thermography, vascular patterns (e.g., finger, palm and/or eye vein patterns), and voice of a human (or other animal), combinations thereof, and the like. Such information may be detectable using one or more sensors, such as an optical or infrared camera, iris scanner, facial recognition system, voice recognition system, finger/thumbprint device, eye scanner, biosignal scanner (e.g., electrocardiogram, electroencephalogram, etc.). DNA analyzer, gait analyzer, combinations thereof, and the like. One or more of such sensors may be included in or coupled to the client devices described herein.

The term, "biometric reference template" is used herein to refer to a data structure containing biometric reference information of a user, particularly a user that is the target of a biometric authentication protocol.

The term "biometric reference information" is used herein to refer to biometric information (factors) of a user that is/are contained in a biometric reference template.

The terms "client" and "client device" are interchangeably used herein to refer to any of the wide variety of devices that may be used to securely store biometric reference templates and transfer biometric reference templates to a sync server for use in a biometric template restoration and/or synchronization operations. Any suitable mobile or other electronic device may be used as a client device. Non-limiting examples of suitable client devices include biometric authentication terminals, cameras, cell phones, computer terminals, desktop computers, electronic readers, facsimile machines, kiosks, netbook computers, notebook computers, internet devices, payment terminals, personal digital assistants, media players and/or recorders, servers, set-top boxes, smart phones, tablet personal computers, ultra-mobile personal computers, wired telephones, combinations thereof, and the like. Alternatively or additionally, the client devices described herein may be in the form of a smart card, an integrated circuit card, a universal serial bus key, a near field communication (NFC) device, combinations thereof, and the like. Without limitation, the client devices described herein are preferably in the form of a cellular phone, electronic reader, laptop computer. NFC enabled device, notebook computer, smart badge, smart card, smart phone, tablet personal computer, combinations thereof, and the like.

For the sake of clarity the present disclosure often describes embodiments wherein a synchronization system includes two client devices, namely a first and second client device. It should be understood that any number of client devices may be used in the systems described herein. Indeed, the present disclosure envisions systems in which about 1, 2, 3, 5, 10, 25, 50, 100, 1000 or more client devices are used.

The terms "synchronization server" and "sync server" are interchangeably used herein to refer to one or more computing devices that may perform biometric template restoration and/or synchronization operations consistent with the present disclosure. In particular the sync servers described herein may be configured to function in a restoration operation to transmit encrypted biometric reference templates to a client device that has lost access to such templates, e.g., due to corruption or another cause. The sync servers described herein may also function in a synchronization operation to distribute copies of one or more biometric reference templates to a one or a plurality (e.g., 2 or more, such as 3, 4, 5, 10, 20, 50, 100, 1000, etc.) of other client devices consistent with the present disclosure.

In many embodiments the present disclosure describes the use of a sync server that may be executed on a single server machine or a number of server machines which may be co-located or distributed geographically. It should be understood that such description is exemplary only and that a sync server may be in the form of any device that is capable of performing restore and/or synchronization operations consistent with the present disclosure. The sync servers described herein may thus be in the form of one or more mobile or other electronic devices, including those mentioned above as being suitable for use as a client device.

In some embodiments, the sync servers described herein may not be trusted with the possession of unwrapped syc wrapping keys, unwrapped templates, or other client/user sensitive data. In such instances, it may be understood that the sync server may contain encrypted (wrapped) copies of sync wrapping keys, templates, and the like.

The client devices described herein may communicate with one another and/or a sync server, e.g., using close range communication, long range communication, or a combination thereof. The phrase "close range communication" is used herein to refer to technologies for sending/receiving data signals over a wired or wireless interface between devices that are relatively close to one another. Close range communication includes, for example, communication between devices using a close range communications network such as a BLUETOOTH™ network, a personal area network (PAN), near field communication (NFC), a ZigBee network, a wired Ethernet connection, a wired or wireless universal serial bus (USB) connection, radio frequency identification (RFID), combinations thereof, and the like.

In contrast, the phrase "long range communication" is used herein to refer to technologies for sending/receiving data signals between devices that are a significant distance away from one another. Long range communication includes, for example, communication between devices using a long range communications network such as a Wi-Fi network, a wide area network (WAN) including but not limited to a cell phone network (3G, 4G, etc. and the like), the internet, an enterprise network, telephony networks, combinations thereof, and the like. Without limitation, the client(s) and sync server described herein are preferably configured to communicate with one another using long range communication, e.g., over the internet, an enterprise network, or a combination thereof.

The client devices and/or sync servers of the present disclosure may include one or more modules which may be provisioned independently on such devices or stored in a memory thereof. As used in any embodiment herein, the term "module" may refer to software, firmware and/or circuitry that is/are configured to perform or cause the performance of one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hard-wired circuitry, programmable circuitry such as computer processors comprising one or more individual instruction processing cores, state machine circuitry, software and/or firmware that stores instructions executed by programmable circuitry. The modules may collectively or individually be embodied as circuitry that forms a part of a client device or an authentication device.

The clients described herein may include a protected environment for the storage of biometric reference templates. The term "protected environment" is used herein to refer to an execution environment within a client, wherein the execution environment includes memory and processing resources that are isolated or otherwise protected from other components of the client via hardware, firmware, software or a combination thereof.

One example of a protected environment that may be used in the client devices of the present disclosure is a trusted execution environment (TEE). Generally, a TEE is a protected environment that may run alongside an operating system and which can provide secure services to that operating system. More information regarding TEEs and the implementation thereof may be found in the TEE client application programming interface (API) specification v1.0, the TEE internal API (application programming interface) specification v1.0, and the TEE system architecture v1.0 issued by GlobalPlatform.

In some embodiments the client devices described herein include a TEE that was provided using one or more of virtualization technology, uCode enhanced memory page protection, CPU cache as memory page protection, security co-processor technology, and combinations thereof. Non-limiting examples of such technology include INTEL® VT-x virtualization technology, INTEL® VT-d virtualization technology, INTEL® trusted execution technology (TXT), Xeon internet security and acceleration (ISA) "cache as random access memory (RAM)", converged security engine (CSE) technology, converged security and manageability engine (CSME) technology, a security co-processor, manageability engine, trusted platform module, platform trust technology, ARM TRUSTZONE® technology, combinations thereof, and the like. The nature, advantages and limitations of each of these technologies are well understood and are therefore not described herein.

Memory enclave technology is another example of a protected environment that may be used in the client devices described herein. Generally, a memory enclave may be made up of at least one memory page that has a different access policy than the access policy imposed by traditional ring boundaries of a computing system (in this case, a client device). The memory page(s) within a memory enclave may have associated read/write controls, which may be configured such that the read/write controls have exclusivity over certain operating modes or privilege "rings", such as system management mode or virtual machine monitors of an associated processor. Information stored and operations conducted within a memory enclave of an client device may therefore be isolated from other information, operations, and components of the client device. In some embodiments of the present disclosure, an authentication device includes one or more memory enclaves that are configured to temporarily store encrypted or unencrypted biometric reference templates provided by a client device for use in a biometric authentication process. One example of suitable memory enclave technology is Intel® Secure Enclave technology.

The protected environments of the present disclosure may be configured to store encrypted and unencrypted reference templates (such as biometric reference templates), either alone or in conjunction with other information. For example in addition to reference templates, a protected environment may store one or more keys that may be used to encrypt, decrypt, or sign data. For example, a protected environment consistent with the present disclosure may store a sync wrapping key (SWK) that is specific to its corresponding client device or, more specifically, to the protected environment within the client device. Likewise, a protected environment may temporally (e.g., for a specified time) or permanently store sync wrapping keys that are specific to other (e.g., second, third, etc.) client devices and/or protected environments on such devices. A protected environment may also store one or more signing keys (e.g., a TEE and/or enclave signing key). Such signing key(s) may be specific to the protected environment and may enable the protected environment to sign with the key and thus "seal" the data to the protected environment.

The protected environments described herein may be configured to produce their own encryption (e.g., sync wrapping) and/or signing keys. For example, a protected environment may include one or more key generation modules that when executed by processing resources (within or external to the protected environment) cause the protected environment to generate a sync wrapping key specific to the protected environment, a signing key specific to the environment, and combinations thereof. Such features may be useful for example in instances where temporal (e.g., time sensitive) sync wrapping and/or signing keys are sync wrapping keys are employed. In such instances, the protected environment may be configured to generate new key(s) if and when an existing key has expired, e.g., in accordance with one or more key maintenance policies.

The protected environment described herein may also include other information, such as attestation information that may be used to attest to the authenticity and/or security of the protected environment. Non-limiting examples of attestation information include information regarding the vendor, make, model, and/or version of a protected environment. Attestation information may alternatively or additionally include information regarding software, policies, device pairings, etc. that may be executed and/or enforced by the protected environment.

The letter "n" is occasionally used herein as a subscript in connection with one or more elements described in the accompanying figures. In such instances, it should be understood that n is a non-zero integer. Thus, for example, the expression "element $X_n$" should be interpreted as indicating that one ($X_1$) or a plurality element X's can be present. Accordingly, n may equal 1, 2, 3, 4 . . . 100 . . . 1000 . . . 10000 . . . or more, including all positive integer values between and/or above the aforementioned numbers. It should therefore be understood that while the present disclosure may refer to an element in the singular, e.g., element $X_n$, such expressions should be interpreted as also encompassing the plural form.

For the sake of illustration, the present disclosure will proceed to describe various embodiments wherein a synchronization system, method or device is used to register, synchronize, and/or restore one or more biometric templates among one or more client devices. It should be understood that such embodiments are exemplary only, and that the technologies described herein are not limited to the use of biometric templates. Indeed, the technologies described herein may be used to register, synchronize, and/or restore any type of information among one or more devices, including any template suitable for use in an authentication protocol. By way of example, the technologies described herein may be used to register, synchronize and/or restore template that do not include biometric information. Such template may correspond for example to a user password, a password hash, a puzzle for which a user knows the solution, device content, a hash of device context, a hash of a random value, a hash of one or more sync wrapping or other keys, combinations thereof, and the like.

FIG. 1A depicts an example synchronization and restoration system consistent with the present disclosure. As shown, system 100 includes first client device $101_1$ (client $101_1$) and one or more second client devices $101_n$ (client $101_n$), which may be omitted where system 100 is to only provide restoration operations for client $101_1$. System 100 further includes synchronization (sync) server 103. Clients $101_1$, $101_n$ may each include protected environments $110_1$, $110_n$ (shown in FIG. 1B). Clients $101_1$, $101_n$ may communicate with one another and with sync server 103 directly (not shown) and/or via network 102. In this regard, network 102 may be any suitable network, such as a short range communication network, a long range communication network, and combinations thereof. Without limitation, network 102 is preferably a long range communications network such as the internet.

Figure 1B:
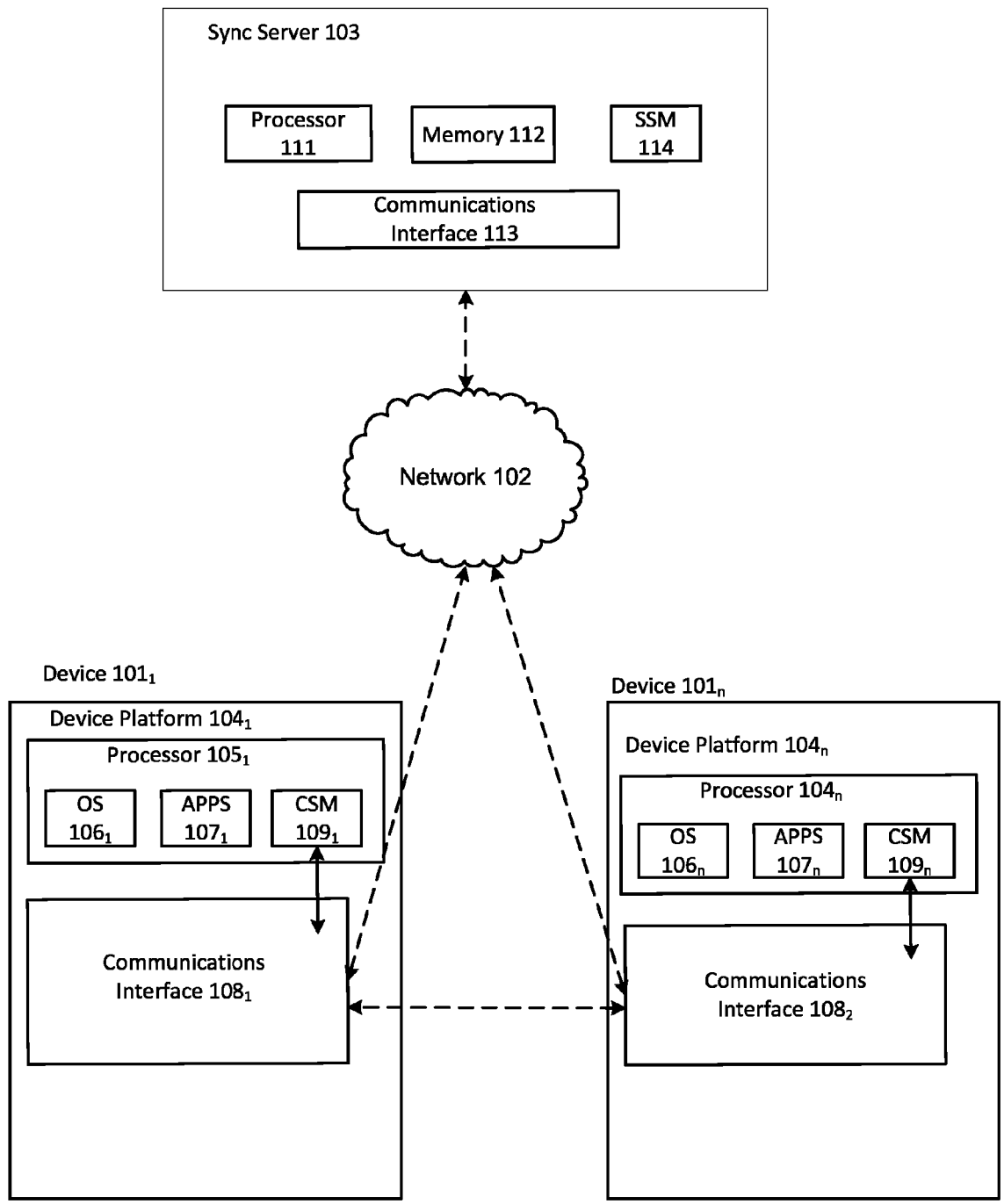
FIG. 1B is a block diagram illustrating exemplary device architecture for elements of a synchronization and restoration system consistent with the present disclosure.

FIG. 1B depicts exemplary device architecture for the client devices and a sync server included in system 100 of FIG. 1A. As shown clients $101_1$, $101_n$ include respective device platforms $104_1$, $104_n$. In general, device platforms $104_1$, $104_n$ may be consistent with the form factor and/or type of mobile or other electronic device used as clients $101_1$ and $101_n$, respectively. For example if client $101_1$ is in the form of a smart phone and client $101_n$ is in the form of a desktop computer, device platforms $104_1$, $104_n$ may be a smart phone and a desktop computer platform, respectively. It should therefore be understood that device platforms $104_1$, $104_n$ may correlate to any platform suitable for use in connection with the mobile and other electronic devices specified herein as being suitable for use as a client device consistent with the present disclosure.

For the sake of example device platforms $104_1$, $104_n$ have been illustrated with limited and similar components. This is for illustration only and it should be understood that device platforms $104_1$, $104_n$ may include other components including components that may be traditionally found in a device platform corresponding to the type and nature of the mobile or other electronic device used as clients $101_1$ and $101_n$. It should also be understood that platforms $104_1$, $104_n$ need not be the same.

Device platforms $104_1$, $104_n$ respectively include processors $105_1$, $105_n$, memories $107_1$, $107_n$, and communications interfaces $108_1$, $108_n$. Any suitable processor may be used as processors $105_1$ and/or $105_n$, including but not limited to general purpose processors and application specific integrated circuits. Such processors may be capable of executing one or multiple threads on one or multiple processor cores.

The type and nature of processors $105_1$, $105_n$ may be selected based on numerous factors such the form factor of clients $101_1$, $101_n$, desired power consumption, desired processing capability, combinations thereof, and the like. Non-limiting examples of suitable processors that may be used as processors $105_1$, $105_n$ include the mobile and desktop processors commercially available from INTEL®, Advanced Micro Devices (AMD®), APPLE®, SAMSUNG®, and NVIDIA®. Without limitation, processors $105_1$, $105_n$ are preferably an INTEL mobile processor or an application specific integrated circuit. It should be understood that processor $105_1$ need not be the same type of processor as processor $105_n$.

Memories $107_1$, $107_n$ may be any suitable type of computer readable memory. Exemplary memory types that may be used as memory $107_1$ and/or $107_n$ include semiconductor firmware memory, programmable memory, non-volatile memory, read only memory, electrically programmable memory, random access memory, flash memory (which may include, for example NAND or NOR type memory structures), magnetic disk memory, optical disk memory, combinations thereof, and the like. Additionally or alternatively, memory $107_1$ and/or memory $107_n$ may include other and/or later-developed types of computer-readable memory. It should be understood that memory $107_1$ and memory $107_n$ need not be the same type of memory. For example, memory $107_1$ may be or include flash memory, whereas memory $107_n$ may be or include random access memory, magnetic memory, or a combination thereof.

As shown, sync server 103 may include processor 111, memory 112, and communications interface 113. The type and nature of the processors and memory that may be used as processor 111 and memory 112 are the same as those described previously for processors $105_1$, $105_n$ and memories $107_1$, $107_n$. A detailed description of the type and nature of processors and memories that may be used as processor 111 and memory 112 is therefore not reiterated for the sake of brevity.

Communications interfaces $108_1$, $108_n$, and 113 are generally configured to enable communication between clients $101_1$, $101_n$ and/or sync server 103 using a predetermined wired or wireless communications protocol, such as but not limited to an Internet Protocol, WI-FI protocol. BLUETOOTH protocol, combinations thereof, and the like. Communications interfaces $108_1$, $108_n$ may therefore include hardware (i.e., circuitry), software, or a combination of hardware and software that allows clients $101_1$, $101_n$ to respectively send and receive data signals to/from one another, as well as to/from communications interface 113 of sync server 103. In particular, communications interfaces $108_1$, $108_n$ may be configured to enable client devices $101_1$, $101_n$ to send device registration requests, template registration requests, restoration requests, and/or synchronization requests to communications interface 113. In turn, communications interface 113 preferably configured to receive such requests and to transmit registered biometric reference templates to clients $101_1$ and/or $101_n$. Such interfaces may therefore include one or more transponders, antennas. BLUETOOTH™ chips, personal area network chips, near field communication chips, Wi-Fi chips, cellular antennas, combinations thereof, and the like.

As further illustrated in FIG. 1B, client devices $101_1$, $101_n$ respectively include protected environments $110_1$, $110_n$. Such environments may be form of a TEE, a memory enclave, another type of protected environment, or a combination thereof. Without limitation, protected environments $110_1$, $110_n$ are preferably in the form of a TEE.

Client devices $101_1$, $101_n$ may also respectively include client synchronization modules (CSM) $109_1$, $109_n$, and sync server 103 may include server synchronization module (SSM) 114. For the sake of illustration CSM $109_1$, CSM $109_n$ and SSM 114 are illustrated a separate from other elements of client devices $101_1$, $101_n$, and sync server 103, respectively. Such configuration is for example only and CSM $109_1$, CSM $109_n$ and SSM 114 may be respectively provisioned on client devices $101_1$, $101_n$, and sync server 103 in any suitable manner. For example CSM $109_1$ and CSM $109_n$ may be respectively provisioned within memories $107_1$, $107_n$, and/or within protected environments $110_1$, $110_n$. CSM $109_1$, $109_n$ may alternatively or additionally be provisioned within a memory local to processors $105_1$, $105_n$, respectively. SSM 114 may also be provisioned with memory 112, within a memory local to processor 111, combinations thereof and the like.

Regardless of how they are provisioned CSM $109_1$, CSM $109_n$ and SSM 114 may respectively include computer readable instructions that when executed by processors $105_1$, $105_n$, and 111 (as appropriate), respectively cause client devices $101_1$, $101_n$ and sync server 103 to perform device registration, template registration, template restoration and/or template synchronization operations consistent with the present disclosure.

Execution of CSM $109_1$ and/or CSM $109_n$ may respectively cause clients $101_1$, $101_n$ to perform device registration operations with sync server 103. In this context, "device registration" means that a client device may indicate to sync server 103 that it wishes to participate in synchronization and/or restoration system 100. For example, execution of CSM $109_1$ may cause client $101_1$ to transmit a device registration request message to sync server 103. As will be described later, the device registration request may include device information relevant to client $101_1$, as well as an indication of other devices with which device $101_1$ wishes to be synchronized (e.g., client $101_n$), either alone or with other information. Execution of CSM $109_n$ may similarly cause client $101_n$ to send a device registration request to sync server 103. The device registration request message from client $101_n$ may include similar information as the device registration request message from client $101_1$, albeit relevant to client $101_n$.

Execution of SSM 114 may, in response to receiving a device registration request, cause sync server 103 to analyze the device registration request and assign the client associated with the request to a synchronization pool. The synchronization pool to which the client is assigned may be determined based on one or more indicators in the device registration request message, a policy enforced by sync server 103, or a combination thereof.

For example in sync server 103 may receive device registration requests from client $101_1$ and/or client $101_n$ that indicate that client $101_1$ wishes to be synchronized with client $101_n$ and/or vice versa. In response to such request sync server may create a record of clients $101_1$ and $101_n$ (e.g., in a database) and assign them to one or more synchronization pools. For example sync server 103 may allocate client devices $101_1$, $101_n$ to the same synchronization pool. Later pursuant to a synchronization operation, sync server 103 may push, upload, or otherwise distribute one or more registered biometric templates to the protected environments of all or subset of client devices $101_1$, $101_n$, as well as other clients within the same synchronization pool.

As discussed previously one or more of client devices $101_1$, $101_n$ may be configured to store biometric reference templates in protected environments $110_1$, $110_n$, respectively. Although plaintext of the biometric templates may be securely stored in such an environment, the templates are preferably stored in encrypted form for added security (or another purpose). Clients $101_1$, $101_n$ may therefore encrypt the plaintext of biometric templates within protected environments $110_1$, $110_n$, e.g., using an asymmetric or symmetric key encryption protocol. The resulting encrypted templates may then be stored within protected environments $110_1$, $110_n$.

A client device may also seal an unencrypted or encrypted biometric template to its protected environment, e.g., by signing the template with a digital signature specific to the client's protected environment. Any suitable digital signature may be used, including but not limited to a hash of the client's protected environment or other client specific identifying indicia. In some embodiments a client device may encrypt a biometric reference template with a protected environment key (e.g., a TEE key, a memory enclave key, etc.) that is specific to the client's protected environment, and store the resulting cipher text in the protected environment.

Biometric reference template registration may be performed in a biometric template registration operation, which may be instigated by the execution of one or more of CSM $101_1$, CSM $101_n$, and SSM 114. For example execution of at least one of CSM $101_1$. CSM $101_n$ and SSM 114 may prompt client $101_1$ and/or client $101_n$ to transmit a biometric template registration signal to sync server 103. The biometric template registration signal may include a copy of one or more biometric templates that are stored in protected environments $110_1$, $110_n$, respectively, optionally in conjunction with device identification indicia (device ID or DevID) that identifies the originating client (in this case, client $101_1$). Non-limiting examples of device ID include a measurement of a client's protected environment, a hash thereof, a hardware identifier, a protected environment identifier (e.g., a TEE identifier or memory enclave identifier), the identity of an independent software vendor (ISV) that may have provisioned the protected environment on the client, combinations thereof, and the like.

Alternatively or additionally, the device ID of a client may include other information such as the user name(s) of authorized users of a client, the client's machine (platform) identifier, application specific identification indicia, information regarding biometric sensors and/or factors supported by the client, a one-time password bound to the client, symmetric or asymmetric keys bound to the client, random numbers bound to the client, a universally/globally unique identifier (UUID/GUID) bound to the client, combinations thereof, and like. Regardless of the nature of the device ID, sync server 103 may store received biometric templates and identifying indicia associated therewith in memory as a registered biometric reference template. The registered biometric template may also be stored in association with its originating client device, e.g., in a database or other data structure.

Client devices $101_1$, $101_n$ may also be configured to perform biometric template registration operations before, during or after the performance of device registration operations. Without limitation template registration preferable occurs in conjunction with or shortly after (e.g., contemporaneously with) device registration, e.g., so as to facilitate the association of the registered templates with an originating client device.

As will be further described below CSM $109_1$, $109_n$ when executed pursuant to a template registration operation may respectively cause clients $101_1$ and/or $101_n$ to transmit a template registration request message to sync server 103. The template registration request may include a copy of one or more biometric reference templates which have been encrypted with a sync wrapping key (SWK) specific to the client transmitting the request. Thus for example during a template registration operation, client $101_1$ may transmit a template registration message to sync server 103 that includes a copy of its biometric reference templates as encrypted by an SWK specific to client $101_1$, e.g., $SWK_1$.

The template registration message may also include registration information that facilitates or enables sync server 103 to store the encrypted template in association with information identifying the originating client. For example a template registration message may include registration information that identifies client device $101_1$ (e.g., all or a portion of client $101_1$'s device ID), and/or which points to a registration record of client device $101_1$ already on sync server 103.

The template registration process may by repeated by each of the client devices that will participate in the restoration and/or synchronization system. Thus in the example of FIG. 1B, client device $101_n$ may perform similar operations as client $101_1$ to register its biometric templates (if any) with sync server 103. Therefore upon completion of template registration, sync server 103 may be provisioned with biometric templates for each client participating in system 100.

At any time before, during or after device and/or template registration, execution of CSM $109_1$, $109_n$ may cause clients $101_1$, $101_n$ to perform key exchange and key registration operations consistent with the present disclosure. During such operations, the client devices may exchange sync wrapping keys with each other. Upon receipt of a sync wrapping key, a client may use its own sync wrapping key to encrypt the received key within its protected environment. Thus for example, execution of CSM $109_n$ may cause client $101_n$ to transmit a copy of its SWK (i.e., $SWK_n$) to client 101. In response CSM $109_1$ when executed may cause client $101_1$ to encrypt $SWK_n$ with its own wrapping key, namely $SWK_1$. The resulting encrypted key ($\{SWK_n\}\_SWK_1$) may then be transmitted to sync server 103 and stored in association with a particular client, synchronization pool, or the like. Execution of CSM $109_1$ may cause device $101_1$ to perform similarly, i.e., to exchange its sync wrapping key ($SWK_1$) with client $101_n$. In response to receiving $SWK_1$. CSM $109_n$ when executed may cause client $101_n$ encrypt $SWK_1$ with $SWK_n$, and to register the resulting encrypted key ($\{SWK_1\}$)_$SWK_n$) with sync server 103 in connection with a particular client, synchronization pool, or the like.

Once device registration and template registration is complete, system 100 may be used to perform template restoration operations and template synchronization operations consistent with the present disclosure. Such operations may for example be initiated by one or more of CSM $109_1$, $109_n$ and SSM 114. When executed, one or more of such modules may instigate the transmission of a restoration request, e.g., from a client device for which template restoration is desired.

Client $101_1$ may for example register its templates with sync server 103, and subsequently lose access to such templates. It may therefore be desirable to restore client device $101_1$'s templates using the registered templates on sync server 103. In such instance CSM $109_1$ when executed may cause device $101_1$ to transmit a template restoration request to sync server 103. Alternatively or additionally, execution of CSM $109_n$ and/or SSM 114 may cause device $101_1$, $101_n$, and/or sync server 103 to generate and/or transmit a template restoration request targeting client device $101_1$.

The template restoration request may include a request to restore the biometric templates (and optionally other information) for client device $101_1$. The template restoration request may further also include information needed for sync server 103 to adequately verify the authenticity of the request and, optionally, the suitability of client device $101_1$'s protected environment to store biometric reference templates.

Assuming sync server 103 adequately verifies the authenticity of the template restoration request and the suitability of client device $101_1$'s protected environment (or if such verification is not required). SSM 114 when executed may cause sync server 103 to transmit relevant registered biometric templates to client device $101_1$. Because the registered templates are encrypted with client device $101_1$'s sync wrapping key (i.e., $SWK_1$) they may be protected from third parties even if they are intercepted during transmission or at another time. Upon receipt. CSM $109_1$ when executed may cause client $101_1$ to store and decrypt the received templates within protected environment $110_1$, e.g., using $SWK_1$. CSM $109_1$ may then cause client $101_1$ to re-encrypt the plaintext of the biometric templates (e.g., using a protected environment key specific to protected environment $110_1$) and/or to seal the templates to protected environment $110_1$ (e.g., by signing the templates with a signing key specific to protected environment $110_1$).

Similarly, once multiple clients have been registered and at least one client has registered templates with a sync server, system 100 may be used to perform template synchronization operations. Such operations may be initiated by one or more of CSM $109_1$, $109_n$ and SSM 114. When executed, one or more of such modules may instigate the transmission of a synchronization request from any client in a synchronization pool, and/or from a sync server governing the synchronization operation. Thus for example, execution of one or more of CSM $109_1$, $109_n$, and/or SSM 114 may cause client device $101_1$ to issue a synchronization request, client $101_n$ to issue a synchronization request, and/or sync server 103 to issue a synchronization request.

CSM $109_1$, $109_n$ and/or SSM 114 may be configured to initiate a synchronization operation in response to a user input, periodically, and/or in accordance with a schedule enforced by one or more of such modules. Template synchronization operations may thus be performed in a desired manner so as to ensure that each client (or a designated subset of clients) in a synchronization pool is provided with a desired (e.g., up to date) set of biometric templates.

For example clients $101_1$ and $101_n$ may have performed device and template registration operations with sync server 103, and may be assigned by sync server 103 to the same synchronization pool. Sync server 103 may also have been provided with a copy of client $101_1$ sync wrapping key as encrypted by client $101_n$'s sync wrapping key (i.e., $\{SWK_1\}\_SWK_n$. In instances where client $101_n$ is multiple client devices (e.g., client $101_2$, $101_3$, etc.), sync server may have been provisioned with copies of client $101_1$ SWK as encrypted by the sync wrapping key for each of clients $101_2$, $101_3$, etc (i.e., $SWK_2$, $SWK_3$). In any case, CSM $109_1$ when executed may, in response to a user input or other stimulus, cause client $101_1$ to initiate a synchronization operation by transmitting a synchronization request message to sync server 103. The synchronization request may include an indication that all or a subset of devices in the synchronization pool (e.g., client $101_n$) are to be provided with client $101_1$'s registered biometric templates.

SSM 114 when executed may, in response to receiving the synchronization request, cause sync server 103 to transmit a copy of client $101_1$'s registered templates (e.g., client $101_1$'s templates as encrypted by $SWK_1$), as well as client $101_1$'s encrypted sync wrapping key (i.e., $\{SWK_1\}\_SWK_n$) to client $101_n$ and/or other clients identified in the request. In response CSM $109_n$ when executed may cause client $101_n$ to decrypt $SWK_1$ using $SWK_n$ within protected environment $110_n$. CSM $109_n$ may also cause client $101_n$ to use $SWK_1$ to decrypt client $101_1$'s registered templates within protected environment $100_n$. This process may repeat for any or all clients in a synchronization pool (e.g., client $101_2$, client $101_3$, etc.). Any or all clients in a synchronization pool may thus be provided with a copy of client $101_1$'s registered templates. Once received, client $101_1$'s registered templates may be stored by each client (encrypted or unencrypted) within each client's protected environment. Accordingly, client $101_n$ may store client $101_1$'s biometric templates in protected environment $110_n$.

In some embodiments CSM $109_n$ when executed may further cause client $101_n$ to inspect client $101_1$'s biometric templates to determine whether the biometric factors within such templates are compatible with client $101_n$'s biometric sensors. This may be particularly useful in instances where client $101_n$ is also configured to perform biometric authentication operations, i.e., to verify the identity of a user by collecting biometric information from the user and comparing it to the biometric information in the biometric reference templates received from client $101_1$.

Biometric information within a biometric template may be considered compatible with a client's biometric sensors when it is of the same type and/or format (or may be converted to the same type and/or format) as the biometric information that may be collected with a client's sensors. Thus for example if client $101_n$ is equipped with a finger print sensor and client $101_1$'s registered templates only include retinal information, client $101_1$'s biometric templates may be considered incompatible with client $101_n$ and CSM $109_n$ may cause client $101_n$ to initiate the collection of compatible biometric reference information from the user using its available sensors. Alternatively if client $101_1$'s registered templates include fingerprint information that is of the same type and/or format as may be obtained with client $101_n$'s sensors, client $101_1$'s biometric templates may be considered compatible with client $101_n$, and client $101_n$ may store such templates. e.g., for use in a biometric authentication protocol.

Figure 3:
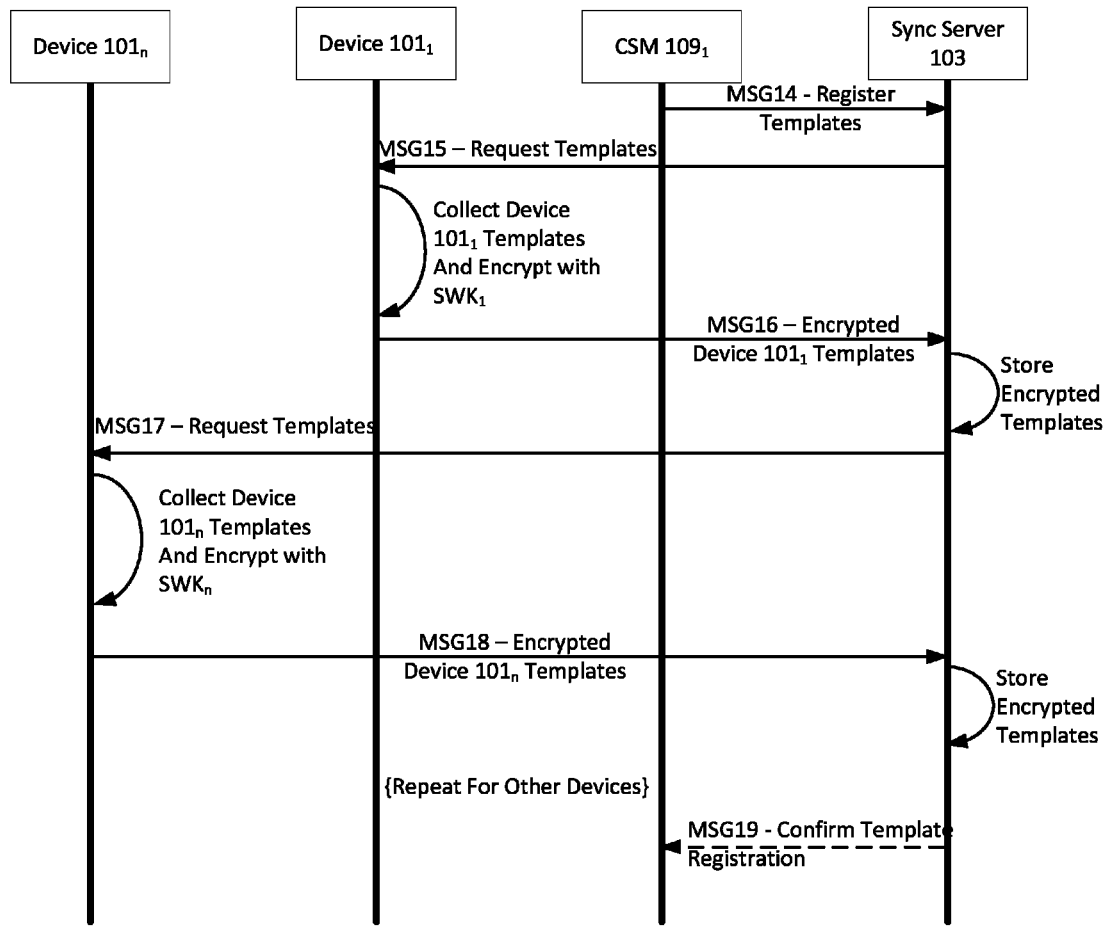
FIG. 3 depicts an exemplary signaling protocol for registering biometric templates of one or more registered client devices on a synchronization server consistent with the present disclosure.
Figure 4:
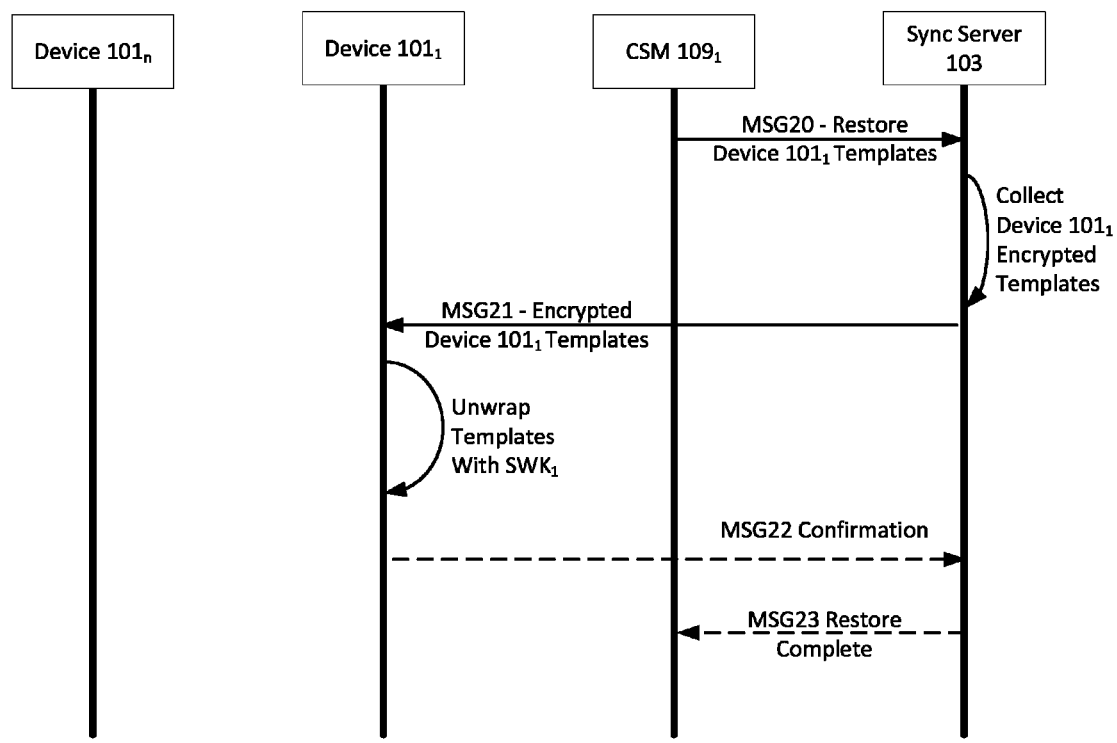
FIG. 4 depicts an exemplary signaling protocol for restoring biometric templates to a client device consistent with the present disclosure.
Figure 5:
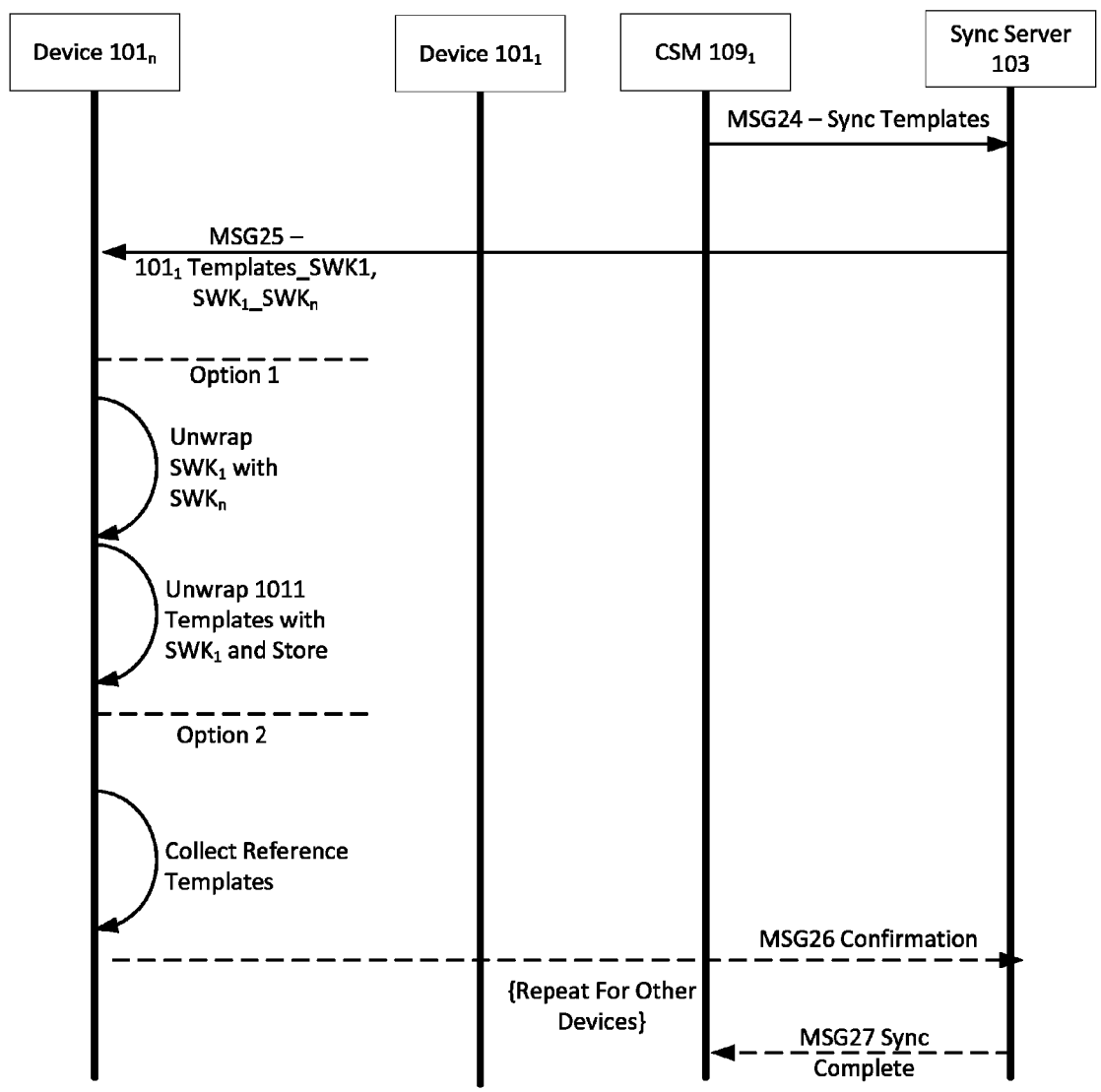
FIG. 5 depicts an exemplary signaling protocol for synchronizing biometric templates among registered client devices consistent with the present disclosure.

Another aspect of the present disclosure relates to methods for registering client devices and biometric templates, and for performing biometric template restoration and/or synchronization operations consistent with the present disclosure. Reference is therefore made to FIGS. 2-5, which depict exemplary messaging flows for registering client devices (FIG. 2), registering biometric templates (FIG. 3), performing template restoration (FIG. 4), and performing template synchronization (FIG. 5). It should be noted that FIGS. 2-5 have been presented in the form of messaging flows for the sake of clarity only, and that such figures may also be understood as described exemplary methods for performing the client registration, template registration, template restoration, and template synchronization operations consistent with the present disclosure.

Figure 2:
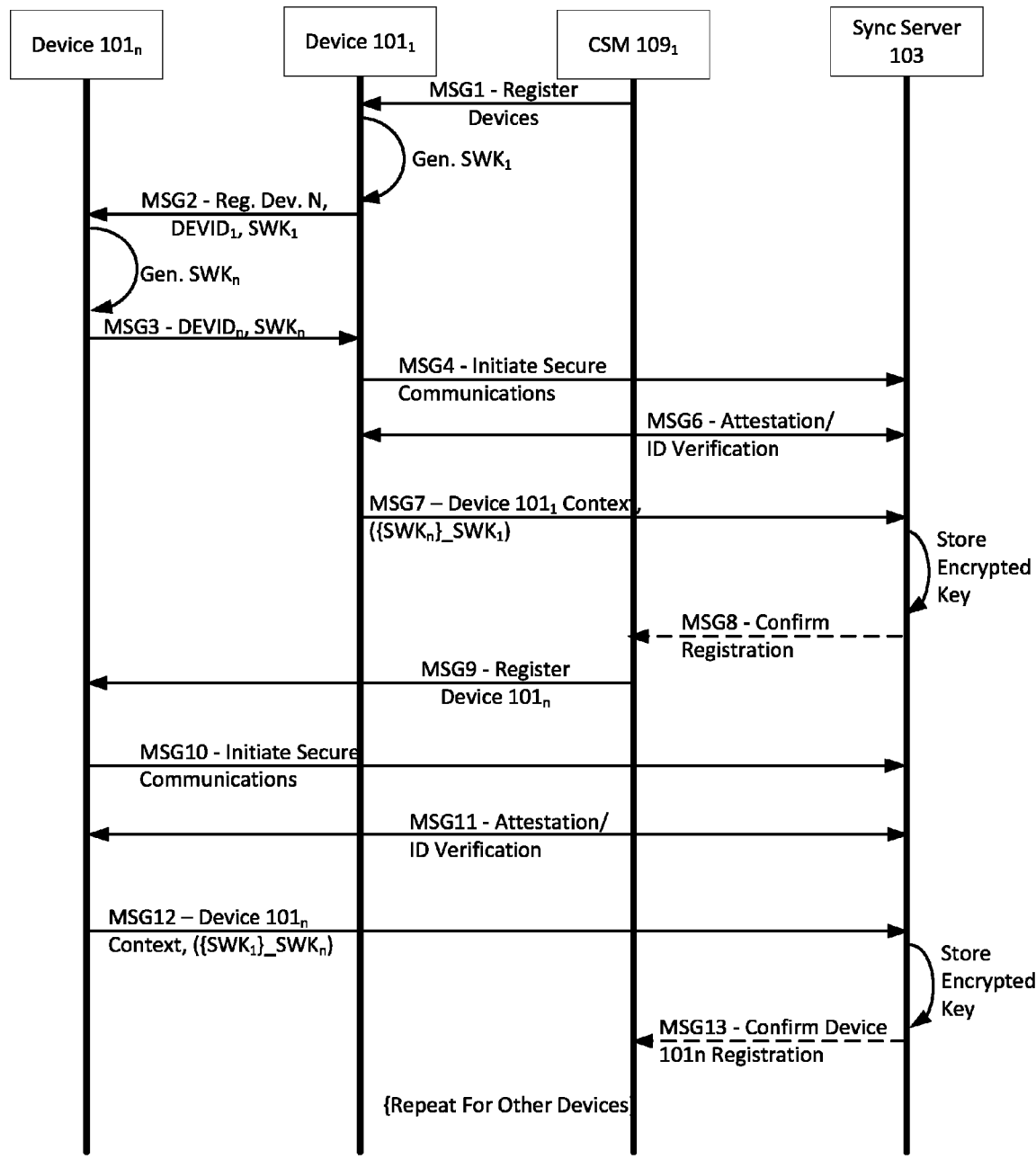
FIG. 2 depicts an exemplary signaling protocol for registering one or more client devices with a synchronization server, consistent with the present disclosure.

FIG. 2 illustrates an exemplary messaging flow for registering one or more client devices with a synchronization server consistent with the present disclosure. As shown the messaging flow may begin with the instigation of a registration operation by one or more modules on a client device. For the sake of example CSM $109_1$ on client $101_1$ is illustrated in FIG. 2 as initiating device registration by generating a first device registration message (MSG1-Register Devices) targeting device $101_1$. It should be understood that this indication is exemplary only, and that CSM $109_1$. CSM $109_n$, and/or SSM 103 may be configured to initiate device registration by generating a first device registration message targeting any suitable client device.

As further shown in FIG. 2, client $101_1$ may be configured to generate a sync wrapping key that is specific to it (i.e., $SWK_1$) in response to MSG1. More specifically, protected environment $110_1$ of client $101_1$ may generate $SWK_1$ in response to receiving MSG1. Alternatively or additionally, $SWK_1$ may have been pre-provisioned within protected environment $101_1$. In any case, $SWK_1$ may be an encryption key that is specific to client $101_1$ (and/or protected environment $110_1$ thereof) and which may be used to encrypt biometric templates and optionally other information using a suitable symmetric or asymmetric key encryption protocol.

Once $SWK_1$ is generated, client $101_1$ may send a second device registration message (MSG2) to other client devices with which it wishes to synchronize. This concept is illustrated in FIG. 2 by the indication the client $101_1$ transmits MSG2 to client(s) $101_n$, which may be one or more other client devices. In this regard, client $101_1$ may have been made aware of client(s) $101_n$ in any suitable manner. For example client $101_1$ may have been pre-provisioned with a database of other clients with which it may wish to synchronize. Alternatively or additionally, client $101_1$ may detect the presence of client $101_n$ or other clients using a wireless or wired detection protocol. Regardless, client $101_1$ may transmit MSG2 to each other client with which it wishes to synchronize. Therefore if client(s) $101_n$ are multiple additional client devices (e.g., client $101_2$, $101_3$, etc.), client $101_1$ may transmit MSG2 to each of those clients.

MSG2 may include device identification indicia (DevID, as described above) for client $101_1$, as well as a copy of $SWK_1$. For protection of this information or another purpose, all or part of MSG2 may be encrypted by client $101_1$ (e.g., using a suitable symmetric or asymmetric encryption protocol), and/or may be transmitted over a secure communications session which may be established between client $101_1$ and client $101_n$ using known secure communications protocols. For example prior to transmitting $SWK_1$ to client $101_n$, client $101_1$ may encrypt $SWK_1$ using a public key encryption protocol such as a Rivest, Shamir, Adleman (RSA) protocol. That is, client $101_1$ may encrypt $SWK_1$ using a public key of client $101_n$, in which case device $101_n$ may use its private key to decrypt the ciphertext of $SWK_1$. In such instances, clients $101_1$, $101_n$ may have been pre-provisioned with the necessary keys to successfully execute RSA or other encryption.

Communications between Device $101_1$ and other devices (e.g., Device $101_n$) may preferably occur over a secure communications link established between the devices. Accordingly, the communications between Device $101_1$ and Device $101_n$ (which may include device identifiers, sync wrapping keys, etc.) may take place using a secure communications channel such as transport layer security (TLS), a sign and mac (SIGMA) session, combinations thereof, and the like. One purpose of the secure communications link between such devices may be to prevent third parties (e.g., a man in the middle attacker) from obtaining one or more of the sync wrapping keys of the participating devices, resulting in a loss of user privacy.

In response to receiving MSG2, client $101_n$ may generate its own sync wrapping key in a protected environment (e.g., protected environment $110_n$). Alternatively or additionally, $SWK_n$ may have been previously provisioned to client $101_n$'s protected environment, in which cause the generation of $SWK_n$ may be skipped. In any case CSM $109_n$ when executed may cause client $101_n$ to send a response message (MSG3) to client $101_1$. As shown, MSG3 may include device identification indicia (DevID) for client $101_n$, as well as a copy of $SWK_n$. Like MSG2 all or a portion of MSG3 may be encrypted prior to transmission, and/or may be transmitted over a secure communications channel link between client $101_n$ and client $101_1$. For example CSM $109_n$ when executed may cause client $101_n$ to encrypt $SWK_n$ using RSA or another encryption protocol prior to transmission. In instances where $SWK_n$ is encrypted with a public key of device $101_1$. CSM $109_1$ may cause device $101_1$ to decrypt the encrypted $SWK_n$ using a corresponding private key.

Client $101_1$ a may at any time initiate the establishment of a secure communications session between it and sync server 103, e.g., by sending a secure communications request (MSG4) to sync server 103 as shown in FIG. 2. In response to MSG4, SSM 114 when executed may cause sync server 103 to transmit a server identification certificate to client $101_1$ (MSG5). Without limitation the server identification certificate may include information that identities sync server 103 to client $101_1$. For example the server certificate may be expressed as an X.509v3 certificate, a signed XML document or other formatting that includes a signature block (encrypted hash of the data fields in the certificate), where these fields include identifying information about the sync server and/or the entity providing the sync server. This may include the entities legal (incorporated name), given names of any of its officers, the location of its incorporation, operation and cyber identifiers such as DNS name, URL or other network address, combinations thereof, and the like.

The server certificate may be used by the clients described herein to verify that the server is authorized to provide restoration and/or synchronization services. In this regard, the clients described herein may be configured to create and enforce a policy that identifies a sync server using some or all of the attributes in the server certificate, and assigns a degree of trust to the sync server. For example, a sync server may be trusted by client to perform restoration and synchronization services for a set time period (e.g., a number of days, months, years, etc.), as may be defined in a contract between the client owner and the sync server provider. Clients may check that such elements are met by inspecting the server certificate.

Clients may also verify the authenticity of a server by validating a digital signature applied to the server certificate. For example, the sync server may sign its server certificate with an enhanced privacy identifier (EPID) private key, in which case the clients described herein may verify the signature using a corresponding EPID public key.

Establishment of a secure communications session between client $101_1$ and sync server 103 may be conditioned on successful verification of the identity of client device $101_1$ to sync server 103 and vice versa. Client $101_1$ and sync server 103 may therefore execute an attestation protocol so that client $101_1$ may verify the authenticity and/or identity of sync server 103, and vice versa. In this regard, client $101_1$ and sync server 103 may exchange attestation information with each other by exchanging attestation messages (MSG 6), as shown in FIG. 2.

In some embodiments verification of the identity and/or authenticity of client $101_1$ and sync server 103 may be carried out using one or more electronic signature protocols, such as the INTEL® Enhanced Privacy Identification (EPID) cryptosystem, the direct autonomous attestation (DAA) protocol, a remote anonymous attestation (RAA) protocol, a SIGMA (sign and message authentication code (MAC)) protocol, combinations thereof, and the like combinations thereof, and the like.

As may be appreciated, EPID is a specialization of DAA with enhanced revocation properties. Details regarding the EPID and DAA cryptosystems may be found in E. Brickell and Jiangtao Li, "Enhanced Privacy ID: A Direct Anonymous Attestation Scheme with Enhanced Revocation capabilities," Aug. 17, 2007 and Brickell et al., "Direct Autonomous Attestation," $11^{th}$ ACM Conference on Computer and Communications Security. Oct. 25-29, 2004. Generally, EPID and DAA permit data to be signed with an enhanced privacy identifier (e.g., an EPID private key) that is unique to one device, and which may be verified using a corresponding public key (e.g., an EPID public key) that is distributed among various other devices.

Accordingly in some embodiments, the client devices and sync servers described herein may store (e.g., in a protected environment) a private key that is specific to each of them, and which may be used in EPID or DAA. The client devices may also store a public key of the sync server, which may have been pre-provisioned to the client devices. Likewise, the sync server may store a public key of each client device, which may have been pre-provisioned to the sync server. Client $101_1$ may use its private key to sign data in an attestation message sent to sync server 103, and sync server 103 may use its private key to sign an attestation message sent to client $101_1$. Client $101_1$ may then use sync server 103's public key to verify the signature of the data in an attestation message received from sync server 103, and thus verify that sync server 103 has possession of the sync server private key. Likewise sync server 103 may use client $101_1$'s public key to verify the signature of the data in an attestation message received from client $101_1$, and thus verify that client $101_1$ has possession of client $101_1$'s private key. If both signatures are verified client $101_1$ may be confident that messages from sync server 103 are authentic, and vice versa. Alternatively or additionally, verification of the identity of sync server 103 and client $101_1$ may be performed using a trusted third party verification system.

If verification of the identity of client $101_1$ and sync server 103 successfully completes (or if such verification is not required), the messaging flow may proceed and the devices may establish a secure communications session. In some embodiments, the secure communications request (MSG4) may specify the manner in which client $101_1$ may wish to establish a secure communications session with sync server 103. Alternatively or additionally, sync server 103 may specify which secure sessions it supports (e.g., in MSG5). Still further, sync server 103 and client $101_1$ may negotiate a mutually supported secure session type, e.g., during the performance of attestation and verification. In such instances, each device may represent to the other which secure communication sessions it supports. e.g., in one or more attestation messages (MSG6).

For example the secure communications request and/or sync server certificate may specify that client $101_1$ and/or sync server 103 wish to use a public key encryption protocol to secure messages transmitted between each others. In such a protocol, client $101_1$ and sync server 103 may establish a secure communications session in which they encrypt messages to one another using their respective public keys. That is, sync server 103 may encrypt messages to client $101_1$ using client $101_1$'s public key (e.g. $C_{pub}$), and client $101_1$ may encrypt messages to sync server 103 using sync server 103's public key (e.g., $S_{pub}$). Client $101_1$ and sync server 103 may decrypt those encrypted messages using their corresponding private keys. I.e., client $101_1$ may decrypt messages encrypted with $C_{pub}$ using its corresponding private key (e.g., $C_{priv}$), and sync server 103 may decrypt messages encrypted with $S_{pub}$ using its corresponding private key (e.g., $S_{priv}$). Client $101_1$ and sync server 103 may thus securely communicate and exchange information using their corresponding public and private keys.

The secure communications request and/or sync server certificate may alternatively or additionally specify that client $101_1$ and/or sync server 103 wish to establish a secure session based on the use of a shared session key (SSK) that may be used to encrypt messages between them. In this regard client $101_1$ and sync server 103 may execute a sign and message authentication code (SIGMA) protocol or another suitable protocol for establishing an SSK. One example of a suitable SIGMA protocol that may be used for this purpose is the modified Sigma protocol described in "SIGMA, the Sign-and-Mac Approach to Authenticated Diffie-Hellman and its Use in the IKE protocol," Hugo Krawczyk, Proceedings of Crypto 2003, Springer-Verlag Lecture Notes in Computer Science No. 2729, p. 399.

If used, the SSK negotiated by client $101_1$ and sync server 103 may be ephemeral, or it may be permanent. If ephemeral the SSK may remain valid for a set number (e.g., 1, 2, etc.) of sessions or for a set time period, after which a new SSK may be needed. In any case, client $101_1$ and sync server 103 may use the SSK to encrypt messages to one another while the secure session is active. Because they each have knowledge of the shared session key, client $101_1$ may decrypt messages encrypted with the SSK from sync server 103, and vice versa. Client $101_1$ and sync server 103 may thus securely exchange messages using the SSK.

Once a secure session is established the messaging flow may proceed and CSM $109_1$ when executed may cause client $101_1$ to transmit a first context message (MSG7) to sync server 103. The first context message may include device context, as well as a copy of $SWK_n$ (and/or other client device sync wrapping keys) as encrypted by $SWK_1$ ($\{SWK_n\}\_SWK_1$). The device context in MSG7 may include for example device identification indicia of client $101_1$ as well as device identification indicia of other clients with which client $101_1$ wishes to be synchronized (in this case client $101_n$). The device context may also include information regarding biometric factors and/or formats that are supported by client $101_1$.

In response to receiving MSG7, SSM 114 when executed may cause sync server 103 to store the device context contained therein in a data structure, e.g., in a synchronization database. Based on the device identification indicia included in the device index. SSM 114 may cause sync server 103 to create and/or allocate the device indicia to a synchronization pool. SSM 114 may also cause sync server 103 to store the encrypted copy of $SWK_n$ ($\{SWK_n\}\_SWK_1$) in the synchronization pool in association with the entry for client $101_1$. At this point registration of client $101_1$ is complete. Accordingly, SSM 114 may optionally cause sync server 103 to send a registration confirmation message (MSG8) to client $101_1$, as shown in FIG. 2.

The foregoing process may then repeat for other clients that are to be included in the same synchronization pool a client $101_1$. Accordingly as shown in FIG. 2. CSM $109_1$ (or another module) may send a second device registration message (MSG9-Reg. Device $101_n$) to client $101_n$. In response. CSM $109_n$ when executed may cause client $101_n$ to initiate a secure communications session with sync server 103. Specifically. CSM $109_n$ may cause client $101_n$ to transmit a second secure communications request (MSG10) to sync server 103. The content and nature of MSG10 is the same as MSG4, except insofar as it pertains to client $101_n$.

In response to MSG10, SSM 114 when executed may cause sync server 103 to transmit a server identification certificate to client $101_n$ (MSG11). The content of the server certificate in MSG11 may be the same as the content of the server certificate of MSG5, and thus is not described again for the sake of brevity. Without limitation, the server identification certificate in MSG11 may include information that identifies sync server 103 to client $101_n$.

Client $101_n$ and sync server 103 may execute an attestation and verification process in the same manner described above for client $101_1$. As that process is substantially the same as the process described above in connection with MSG6 and client $101_1$, it is not described again here. If executed the attestation and verification process may be predicated on the exchange of attestation information (e.g., in MSG12). Execution of the process and may enable client $101_n$ to verify the identity and authenticity of sync server 103, and vice versa. Without limitation, attestation and verification between client $101_n$ and sync server 103 is preferably conducted using an electronic signature, as may be applied with the INTEL™ Enhanced Privacy Identifier (EPID) cryptosystem, the direct autonomous attestation (DAA) protocol, a remote anonymous attestation (RAA) protocol, a SIGMA (sign and message authentication code (MAC)) protocol, combinations thereof, and the like.

If attestation and verification successfully completes (or if it is not required), client $101_n$ and sync server 103 may establish a secure communications session using a mutually supported protocol. Without limitation, client $101_n$ and sync server 103 preferably utilize public key encryption, a secure session key (SSK), or a combination thereof to establish a secure communication session. The nature and implementation of such methods is described above in connection with the establishment of secure communications session between client $101_1$ and sync server 103, and for the sake of brevity is not described again.

Once a secure session is established between client $101_n$ and sync server 103 the messaging flow may proceed and CSM $109_n$ when executed may cause client $101_n$ to transmit a second context message (MSG13) to sync server 103. The second context message may include the same or similar type of information as the first device context message sent by client $101_1$ (MSG7), except insofar as it pertains to client $101_n$. Accordingly. MSG13 may include device context for client $101_n$, as well as a copy of $SWK_1$ (and/or other client device sync wrapping keys) as encrypted by $SWK_n$ ($\{SWK_1\}\_SWK_n$). The device context in MSG13 may include for example device identification indicia of client $101_n$ as well as device identification indicia of other clients with which client $101_n$ is to be synchronized (in this case client $101_1$). The device context may also include information regarding biometric factors and/or formats that are supported by client $101_n$.

In response to receiving MSG13, SSM 114 when executed may cause sync server 103 to store the device context contained therein in a data structure, e.g., in a synchronization database. Based on the device identification indicia included in the device index, SSM 114 may cause sync server 103 to create and/or allocate the device indicia to the synchronization pool established by sync server 103's communications with device $101_1$, and/or to another synchronization pool. In addition, SSM 114 may cause sync server 103 to store the encrypted copy of $SWK_1$ ($\{SWK_1\}\_SWK_n$) in the synchronization pool in association with the entry for client $101_n$. At this point registration of client $101_n$, and SSM 114 may optionally cause sync server 103 to send a registration confirmation message (MSG14) to client $101_1$, as shown in FIG. 2.

The foregoing process may then repeat for other clients (e.g., clients $101_3$, $101_4$, etc.) that are to be included in the same synchronization pool as client $101_1$ and $101_n$. As before, registration of such additional clients will result in the provisioning of device context for each additional client (client $101_3$, $101_4$, etc.) to sync server 103, as well as synchronization keys for other devices in the synchronization pool as encrypted by the synchronization key of each additional client. For example registration of third and fourth clients ($101_3$, $101_4$ not shown) may result in the provisioning of device context for each of those clients to sync server 103. In addition, sync server 103 would be provisioned with a copy of the SWK for each of clients $101_1$, $101_2$, $101_3$, and $101_4$, wherein the SWK of each client is encrypted by the SWK of every other client. That is, sync server 103 would be provisioned with $\{SWK_2\}\_SWK_1$, $\{SWK_3\}\_SWK_1$, $\{SWK_4\}\_SWK_1$, $\{SWK_1\}\_SWK_2$, $\{SWK_3\}\_SWK_2$, $\{SWK_4\}\_SWK_2$, $\{SWK_1\}\_SWK_3$, $\{SWK_2\}\_SWK_3$, $\{SWK_4\}\_SWK_3$, $\{SWK_1\}\_SWK_4$, $\{SWK_2\}\_SWK_4$, and $\{SWK_3\}\_SWK_4$.

For security or other reasons the protected environments of each client in system 100 may be configured to delete sync wrapping keys received from other devices during the device registration process, e.g., in accordance with a security policy enforced by the protected environment itself and/or by a synchronization module executed on the client. For example the protected environment of a (first) client may delete the SWK of other (second, third, etc.) clients after it has used its own SWK to encrypt the SWK of the other clients. Alternatively or additionally, the clients may be configured to retain copies of SWK's received from other client during a device registration process, e.g., in a protected environment thereof. In such instances, it may not be necessary for a sync server to transmit copies of encrypted SWKs to each client during a synchronization process, as each client would already possess a copy of the SWK of each other client in a synchronization pool.

Another aspect of the present disclosure relates to methods for registering biometric templates of one or more client devices with a sync server. Reference is therefore made to FIG. 3, which depicts and exemplary messaging flow for registering biometric reference templates. For the sake of example FIG. 3 illustrates a message flow in which template registration is initiated by the execution CSM $109_1$, which may instigate the transmission of a template registration request (MSG15-Register Templates) to sync server 103. While FIG. 3 shows this request as being produced by CSM $109_1$ directly, it should be understood that the template registration request may be generated and/or transmitted by client $101_1$, client $101_n$, and/or sync server 103, e.g., upon execution of a CSM or SSM thereon. In some instances the template registration request may identify one or more clients for whom template registration is requested, in this case clients $101_1$, $101_n$.

In response to MSG15, SSM 114 when executed may cause sync server 103 to send a first request templates message (MSG16) to client $101_n$. In general, MSG16 may include a request for client $101_1$'s biometric templates and (optionally) identification of the biometric factors client $101_1$ supports. In response to the first request templates message, CSM $109_1$ may cause client $101_1$ to collect its biometric reference templates. CSM $109_1$ may also cause client $101_1$ to protect its templates, e.g., using encryption or a signature protocol. For example, client $101_1$ may encrypt its biometric templates within its protected environment using its sync wrapping key ($SWK_1$). Client $101_1$ may alternatively or additionally seal its biometric templates to its protected environment by signing the templates with a digital signature unique to the protected environment (e.g., a hash of the protected environment). In any case, CSM $109_1$ may then further cause client $101_1$ to transmit a message (MSG17) including the encrypted/sealed biometric templates and optionally information regarding the biometric factor types that client $101_1$ supports to sync server 103.

In response, SSM 103 may cause sync server 103 to analyze MSG 17 and to store the encrypted/sealed biometric templates therein in association with the registration record of client $101_1$. Sync server 103 may thus correlate the encrypted/sealed biometric templates with client $101_1$ and any synchronization pools to which client $101_1$ is allocated.

The operations described above may then repeat for other devices participating in system 100, in this case client $101_n$. That is, SSM 114 may in further response to MSG15 cause sync server 103 to transmit a second request templates message (MSG18) to client $101_n$. CSM $109_n$ may cause client $101_1$ to respond to MSG18 in much the same manner as client $101_1$ responded to MSG16. That is, CSM $109_n$ may cause client $101_n$ to collect its device templates (if any), encrypt/seal such templates within its protected environment, and transmit in MSG19 the encrypted/sealed templates (and optionally biometric factors that client $101_n$ supports) to sync server 103. SSM 114 may cause sync server 103 to respond to MSG19 in substantially the same way as it responded to MSG17, i.e., to store the encrypted templates and other information in association with Client $101_n$.

Once the biometric templates for each client participating in system 100 have been registered with sync server 103, the template registration process is complete. At this point, SSM 114 when executed may optionally cause sync server 103 to transmit a template registration confirmation message (MSG20) to client $101_1$ or, more specifically, to CSM $109_1$.

Another aspect of the present disclosure relates to methods for restoring biometric templates to a client device that has registered itself and its templates with a sync server consistent with the present disclosure. Reference is therefore made to FIG. 4, which illustrates an exemplary messaging flow for a template restoration operation consistent with the present disclosure.

For the sake of example, FIG. 4 depicts a scenario in which template restoration is instigated by CSM $109_1$. It should be understood that this is exemplary only, and that template restoration may be instigated by any client (or module thereof) in system 100, as well as by sync server 103. Moreover, the present disclosure is not limited to scenarios in which a client requests template restoration for itself. Indeed, the present disclosure contemplates scenarios wherein a first client requests template restoration on behalf of a second client. This may be particularly useful in instances where the first and second clients can communication with one another, but only the first client is capable of communicating with sync server 103. In such instances the first client may request and receive the second client's biometric templates from sync server 103, and may subsequent convey the second client's biometric templates to the second client.

Returning to the example of FIG. 4. CSM $109_1$ when executed may instigate the transmission of a restore template request (MSG21), e.g., from device $101_1$ to sync server 103. MSG21 may include device identification indicia that identify client $101_1$ to sync server 103. In response to MSG21, SSM 114 when executed may cause sync server 103 to analyze the device identification indicia and determine to which device registration record in its synchronization database the restore template request pertains. In this example, SSM 114 may cause sync server 103 to determine that MSG21 includes a template restoration request for client $101_1$. SSM 114 may then further cause sync server 103 to collect the client $101_1$'s encrypted biometric templates, which were previously registered pursuant to a template registration operation. Once collected SSM 114 may cause sync server 103 to transmit the encrypted biometric templates to device $101_1$, e.g., in MSG22 shown in FIG. 4. MSG22 may further include information regarding biometric template factors that client $101_1$ supports, as well as other information.

In response to MSG22, CSM $109_1$ may cause client $101_1$ to decrypt the encrypted biometric templates in MSG22 using its sync wrapping key ($SWK_1$). For security, decryption of the biometric reference templates in MSG22 is preferably performed within client $101_1$'s protected environment. Client $101_1$ may then encrypt the plaintext of the biometric reference templates (e.g., using a protected environment key) and/or seal the biometric reference templates to the protected environment with a suitable sealing key. At this point CSM $109_1$ may optionally cause device $101_1$ to transmit a confirmation message (MSG23) to sync server 103, confirming successful restoration of client $101_1$'s biometric reference templates. In response to MSG23, SSM 114 may cause sync server 103 to transmit a restore complete message (MSG24) to client $101_1$ or, more specifically, to CSM $109_1$.

Another aspect of the present disclosure relates to methods for synchronizing biometric templates among multiple client devices. Reference is therefore made to FIG. 5, which illustrates an exemplary messaging flow for a template synchronization operation consistent with the present disclosure.

For the sake of example, FIG. 5 depicts a scenario in which template restoration is initiated by CSM $109_1$ and is executed to synchronize biometric templates among two clients, namely client $101_1$ and client $101_n$. This illustration is exemplary only, and it should be understood that synchronization may be initiated by any client or sync server participating in system 100, and/or by a module thereof. Moreover, it should be understood that the synchronization operation may be executed to synchronize biometric templates among more than two clients, as generally described above.

In the embodiment of FIG. 5, CSM $109_1$ may initiate a synchronization operation by instigating the transmission of a sync templates request message (MSG24) to sync server 103. The sync templates request may be transmitted by any client participating in system 100, such as clients $101_1$, $101_n$.

MSG24 may include a request to synchronize biometric templates among all or a subset of client devices participating in system 100. In this regard, MSG24 may include device identification indicia for each device for which template synchronization is desired. Alternatively or additionally, MSG24 may include information identifying a synchronization pool to which the template synchronization request applies. In the latter case, SSM 114 when executed may cause sync server 103 to interpret the request as applying to all client devices allocated to the identified synchronization pool. Alternatively, MSG24 may identify a synchronization pool to which the template synchronization request applies, and may further identify clients within the synchronization pool for inclusion or exclusion from the synchronization operation.

In response to the template synchronization request, SSM 114 may cause sync server 103 to determine to which client devices the request applies, and to send messages including encrypted biometric templates and potentially other information to such clients. This is illustrated in FIG. 5, wherein sync server 103 is depicted as transmitted biometric templates of client $101_1$ as encrypted with client $101_1$'s sync wrapping key ($SWK_1$) to client $101_n$ in MSG 25.

Because the biometric templates transmitted by sync server 103 to client $101_n$ are encrypted with $SWK_1$, client $101_n$ may be unable to access the plaintext of the templates. This is particularly true in instances where client $101_n$ does not possess a copy of $SWK_1$, or where the version of $SWK_1$ retained by client $101_n$ differs from the version of $SWK_1$ that was used by client 101 to encrypt its biometric templates prior to registering them with sync server 103. In such instances, SSM 114 when executed may further cause sync server 103 to transmit a copy of $SSK_1$ as encrypted by client $101_n$'s SSK (i.e., $\{SSK_1\}\_SSK_n$). e.g., in MSG25 or another message. Upon receipt, client $101_n$ may use $SSK_n$ to decrypt $SSK_1$, and then use $SSK_1$ to decrypt the encrypted biometric templates received in MSG25 within its protected environment. This synchronization process may repeat similarly for other clients participating in system 100, and for which template synchronization is desired.

In some embodiments, the template synchronization operation may further include operations in which each client verifies whether received biometric templates are compatible with available sensors. This may be particularly desirable in instances where a client receiving biometric templates pursuant to a synchronization operation will also perform as a biometric authentication device (i.e., as a device that leverages the received biometric templates to authenticate a user with sensors available to the device).

This concept is illustrated in FIG. 5, wherein client $101_1$ is illustrated as performing one of two optional operations after receiving biometric templates of client $101_1$ from sync server 102. In both options. CSM $109_n$ may causes client $101_n$ to inspect the biometric reference templates of client $101_1$ and determine whether they are compatible with the sensors available to client $101_n$. If the biometric factors included in client $101_1$'s biometric templates are of the same type and format (or may be converted to the same type and format) as the biometric factors that may be collected with client $101_n$'s sensors, the templates may be considered compatible. In such instance. CSM $109_n$ may cause client $101_n$ to store the templates in a protected environment thereof. Alternatively if the biometric factors in client $101_1$'s templates are not of the same type and format (and may not be converted to the same type and format) as the biometric factors that may be collected with client $101_n$'s sensors, the templates may be considered incompatible. In that case, CSM $109_n$ may cause client $101_n$ to delete the biometric templates of client $101_n$ and to prompt a user thereof to enroll biometric factors/templates with it using client $101_n$'s available sensors.

In any case, once client $101_n$ has decrypted the templates in SMG25 (and optionally verified the compatibility of the templates), it may transmit a synchronization confirmation message (MSG26) to sync server 103. The process may then repeat for all other clients participating in the synchronization operation. Once all the clients participating in the operation have received biometric templates of client $101_1$, SSM 114 may cause sync server 103 to transmit a synchronization complete message (MSG27), e.g., to each participating client device. The synchronization operation may then end.

EXAMPLES

Examples of the present disclosure include subject matter such as a devices, methods, means for performing acts of the method, at least one machine-readable medium including instructions that when performed by a machine cause the machine to perform acts of the method, and of an apparatus or system for performing registration, restoration, and/or synchronization operations consistent with the present disclosure, as discussed below.

Example 1

According to this example there is provided a first client device, including: a processor, a memory, a first protected environment having a first template stored therein, and a client synchronization module (CSM) configured to cause the first client device to perform the following operations including: register the first client device with a synchronization server in association with a synchronization pool; encrypt the first template with a first sync wrapping key ($SWK_1$) within the first protected environment to produce a first encrypted template; and register the first encrypted template with the synchronization server in association with a record of the first client device produced by the synchronization server.

Example 2

This example includes the elements of example 1, wherein the first protected environment is selected from the group consisting of a trusted execution environment (TEE), a memory enclave, or a combination thereof.

Example 3

This example includes the elements of any one of examples 1 and 2, wherein the CSM is further configured to cause the first protected environment to generate $SWK_1$.

Example 4

This example includes the elements of any one of examples 1 to 3 wherein the CSM is further configured to cause the first client device to transmit a device registration message including a copy of $SWK_1$ to a second client device within the synchronization pool.

Example 5

This example includes the elements of example 4, wherein the device registration message further includes first device identification indicia of the first client device.

Example 6

This example includes the elements of example 5, wherein the first device identification indicia includes at least one of a measurement of the first protected environment, a hash of the first protected environment, a hardware identifier of the first client device, a protected environment identifier of the first protected environment, and the identity of an independent software vendor (ISV) that provisioned the first protected environment on the first client device.

Example 7

This example includes the elements of any one of examples 4 to 6, wherein the CSM is further configured to cause the first client device to encrypt at least a portion of the device registration message before transmission to the second client device.

Example 8

This example includes the elements of any one of examples 4 to 7, wherein the device registration message is configured to cause the second client device to generate a second sync wrapping key ($SWK_2$) and transmit $SWK_2$ to the first client device.

Example 9

This example includes the elements of any one of examples 4 to 8, wherein the device registration message is further configured to cause the second client device to transmit second device identification indicia of the second client device to the first client device.

Example 10

This example includes the elements of example 9, wherein the second device identification indicia includes at least one of a measurement of a second protected environment within the second client device, a hash of the second protected environment, a hardware identifier of the second client device, a protected environment identifier of the second protected environment, and the identity of an independent software vendor (ISV) that provisioned the second protected environment on the second client device.

Example 11

This example includes the elements of any one of examples 8 to 10, wherein in response to receiving $SWK_2$ from the second client device, the first CSM is further configured to:
cause the first client device to encrypt $SWK_2$ with $SWK_1$ within the first protected environment to produce an encrypted sync wrapping key ($\{SWK_2\}\_SWK_1$); and
register $\{SWK_2\}\_SWK_1$ with the synchronization server in association with the synchronization pool.

Example 12

This example includes the elements of example 11, wherein the CSM is further configured to cause the first client device to establish a first secure communication session between the first client device and the synchronization server.

Example 13

This example includes the elements of example 12, wherein the CSM is configured to establish the first secure communication session before registering the first client device, the first encrypted template, and $\{SWK_2\}\_SWK_1$ with the synchronization server.

Example 14

This example includes the elements of any one of examples 11 and 12, wherein the CSM causes the first client device to initiate the first secure communication session by transmitting a first secure communications request to the synchronization server.

Example 15

This example includes the elements of example 13, wherein the first secure communications request is configured to cause the synchronization server to transmit a server identification certificate to the first client device.

Example 16

This example includes the elements of example 15, wherein the server identification certificate includes at least one of information identifying the synchronization server and information about an entity providing the synchronization server.

Example 17

This example includes the elements of example 15, wherein the CSM is further configured to cause the first client device to verify that the synchronization server is authorized to perform at least one of device registration, template registration, template restoration, and template synchronization operations for client devices within the synchronization pool.

Example 18

This example includes the elements of any one of examples 16 and 17, wherein the server identification certificate is signed by the synchronization server with a digital signature, and the CSM is further configured to cause the first client device to validate the authenticity of the digital signature.

Example 19

This example includes the elements of any one of examples 12-18, wherein prior to establishing the first secure communication session, the CSM is further configured to cause the client device to verify the identity of the synchronization server using at least one of an enhanced privacy identification (EPID) protocol, a direct autonomous attestation protocol, a remote anonymous attestation protocol, and a signature and message authentication code (SIGMA) protocol.

Example 20

This example includes the elements of any one of examples 11-19, wherein the first secure communication session is established using at least one shared session key (SSK).

Example 21

This example includes the elements of any one of examples example 11-20, wherein registering the first client device includes transmitting a first context message to the synchronization server within the first secure communication session, the first context message including first device identification indicia, the first device identification indicia including at least one of a measurement of the first protected environment, a hash of the first protected environment, a hardware identifier of the first client device, a protected environment identifier of the first protected environment, and the identity of an independent software vendor (ISV) that provisioned the first protected environment on the first client device.

Example 22

This example includes the elements of example 21, wherein the first context message further includes a copy of the first encrypted template.

Example 23

This example includes the elements of any one of examples 20 and 21, wherein the first context message further includes a copy of $\{SWK_2\}\_SWK_1$.

Example 24

This example includes the elements of any one of examples 20-23, wherein the first context message is configured to cause the synchronization server to establish a data structure for the synchronization pool and allocate the first encrypted template, $\{SWK_2\}\_SWK_1$, and the first device identification indicia within the data structure.

Example 25

This example includes the elements of example 24, wherein the first device registration message is further configured to cause the second client device to encrypt $SWK_1$ with $SWK_2$ to produce a second encrypted key ($\{SWK_1\}\_SWK_2$).

Example 26

This example includes the elements of any one of examples 24 and 25, wherein the CSM module is further configured to cause the first client device to transmit a second device registration message to the second client device, wherein the second device registration message is configured to cause the second client device to establish a second secure communication session between the second client device and the synchronization server.

Example 27

This example includes the elements of example 26, wherein the second device registration message is further configured to cause the second client device to initiate the second secure communication session by transmitting a second secure communications request to the synchronization server.

Example 28

This example includes the elements of any one of examples 26 and 27, wherein the second device registration message is further configured to cause the second client device to verify that the synchronization server is authorized to perform at least one of device registration, template registration, template restoration, and template synchronization operations for client devices within the synchronization pool.

Example 29

This example includes the elements of any one of examples 27 and 28, wherein the CSM is further configured to cause the second client device to verify the identity of the synchronization server prior to establishing the second secure communication session, using at least one of an enhanced privacy identification (EPID) protocol, a direct autonomous attestation protocol, a remote anonymous attestation protocol, and a signature and message authentication code (SIGMA) protocol.

Example 30

This example includes the elements of any one of examples 27 to 29, wherein the second secure communication session is established based on the use of at least one shared session key (SSK).

Example 31

This example includes the elements of any one of examples 26 to 30, wherein the second client device includes a second protected environment including second template, and the second device registration message is further configured to cause the second client device to: register with the synchronization server in association with the synchronization pool; encrypt, within the second protected environment, the second template with $SWK_2$ to produce second encrypted template; and register the second encrypted template with the synchronization server in association with the synchronization pool.

Example 32

This example includes the elements of example 31, wherein the second device registration message causes the second client device to transmit a second context message to the synchronization server within the second secure communication session, the second context message including second device identification indicia, the second device identification indicia including at least one of a measurement of the second protected environment, a hash of the second protected environment, a hardware identifier of the second client device, a protected environment identifier of the second protected environment, and the identity of an independent software vendor (ISV) that provisioned the second protected environment on the second client device.

Example 33

This example includes the elements of example 32, wherein the second context message further includes a copy of the second encrypted template.

Example 34

This example includes the elements of any one of examples 32 and 33, wherein the second context message further includes a copy of $\{SWK_3\}\_SWK_2$.

Example 35

This example includes the elements of any one of examples 33 and 34, wherein the second context message is configured to cause the synchronization server to store the second encrypted template, $\{SWK_1\}\_SWK_2$, and the second device identification indicia within the data structure for the synchronization pool.

Example 36

This example includes the elements any one of examples 1 to 35, wherein the CSM is further configured to cause the first client device to transmit a restore templates request to the synchronization server, the restore templates request configured to cause the synchronization server to transmit the first encrypted template registered in association with the record of the first client device to the first client device.

Example 37

This example includes the elements of example 36, wherein the CSM is further configured to cause the first client device to decrypt the first encrypted template received from the synchronization server using $SWK_1$.

Example 38

This example includes the elements of any one of examples 1 to 37, wherein a second encrypted template is registered with the synchronization server in association with a record of a second client device, and the CSM is further configured to cause the first client device to transmit a restore templates request to the synchronization server, the restore templates request configured to cause the synchronization server to transmit the second encrypted reference template registered in association with the record of the second client device to at least one of the first client device and the second client device.

Example 39

This example includes the elements of example 38, wherein the restore templates request is configured to cause the synchronization server to transmit the second encrypted template to the first client device, and the CSM is further configured to cause the first client device to transmit the second encrypted template to the second client device.

Example 40

This example includes the elements of example 37, wherein the CSM is further configured to cause the first client device to decrypt the first encrypted template received from the synchronization server within the first protected environment to produce a restored template.

Example 41

This example includes the elements of example 40, wherein the CSM is further configured to cause the first client device to encrypt the restored template with a protected environment key specific to the first protected environment.

Example 42

This example includes the elements of example 40, wherein the CSM is further configured to cause the first client device to sign the restored template with a digital signature key.

Example 43

This example includes the elements of example 42, wherein the digital signature key is a private key specific to the first protected environment.

Example 44

This example includes the elements of example 43, wherein the private key is selected from the group consisting of an enhanced privacy identifier (EPID) private key, a private key used in Rivest Shamir Adlemen (RSA) encryption, a hash of the first protected environment and combinations thereof.

Example 45

This example includes the elements of any one of examples 1 to 44, wherein the CSM is further configured to cause the first client device to transmit a sync templates request message to the synchronization server, the sync templates request message configured to cause the synchronization server to transmit at least one of the first encrypted template and a second encrypted template to client devices within the synchronization pool.

Example 46

This example includes the elements of example 45, wherein the client devices within the synchronization pool include the first client device and at least one second client device.

Example 47

This example includes the elements of any one of examples 45 and 46, wherein the sync templates request message includes device identification indicia for at least one of the first and second client devices.

Example 48

This example includes the elements of any one of examples 45 to 47, wherein the sync templates request message identifies the synchronization pool.

Example 49

This example includes the elements of any one of examples 46 to 48, wherein the second encrypted template is a template encrypted with a sync wrapping key ($SWK_2$) of the second client device, and the sync templates request message further causes the synchronization server to transmit a first template synchronization message including a copy of $SWK_2\_SWK_1$ to the first client device, wherein $SWK_2\_SWK_1$ is a copy of $SWK_2$ as encrypted by $SWK_1$.

Example 50

This example includes the elements of example 49, wherein the sync templates request further causes the synchronization server to transmit a copy of the second encrypted template to the first client device.

Example 51

This example includes the elements of example 49, wherein the CSM further causes the first client device to decrypt $SWK_2\_SWK_1$ to obtain $SWK_2$ within the first protected environment, and to decrypt the second encrypted template with $SWK_2$ within the first protected environment.

Example 52

This example includes the elements of any one of examples 45 to 51, wherein the sync templates request message causes the synchronization server to transmit a second template synchronization message including a copy of $\{SWK_1\}\_SWK_2$ to the second client device, wherein $\{SWK_1\}\_SWK_2$ is a copy of $SWK_1$ as encrypted by the second client device's sync wrapping key, $SWK_2$.

Example 53

This example includes the elements of example 52, wherein the sync templates request message further causes the synchronization server to transmit a copy of the first encrypted template to the second client device.

Example 54

This example includes the elements of example 53, wherein the second client device includes a second protected environment and the second template synchronization message is further configured to cause the second client device to decrypt $SWK_1\_SWK_2$ to obtain $SWK_1$ within the second protected environment, and to decrypt the first encrypted template.

Example 55

In this example there is provided a second client including: a processor, a memory, a second protected environment having a second template stored therein, and a client device synchronization module (CSM) configured to, in response to receiving a device registration message from a first client device: generate a second sync wrapping key $SWK_2$; encrypt the second template with $SWK_2$ to produce a second encrypted template within the second protected environment; register the second client device with a synchronization server in association with a synchronization pool; and register the second encrypted template with the synchronization server in association with a record of the second client device produced by the synchronization server.

Example 56

This example includes the elements of example 55, wherein the second protected environment is selected from the group consisting of a trusted execution environment (TEE), a memory enclave, or a combination thereof.

Example 57

This example includes the elements of any one of examples 55 and 56, wherein the device registration message further includes first device identification indicia of the first client device.

Example 58

This example includes the elements of example 57, wherein the first device identification indicia includes at least one of a measurement of the first protected environment, a hash of the first protected environment, a hardware identifier of the first client device, a protected environment identifier of the first protected environment, and the identity of an independent software vendor (ISV) that provisioned the first protected environment on the first client device.

Example 59

This example includes the elements of any one of examples 55 to 58, wherein in response to the device registration message, the CSM is further configured to cause the second client device to transmit second device identification indicia of the second client device to the first client device.

Example 60

This example includes the elements of any one of examples 55-59, wherein the device registration message includes a first sync wrapping key ($SWK_1$) of the first client device, and the CSM is further configured to cause the second client device to: encrypt $SWK_2$ with $SWK_1$ within the second protected environment to produce a first encrypted key ([$SWK_2\_SWK_1$]); and register {$SWK_2$}_$SWK_1$ with the synchronization server in association with the synchronization pool.

Example 61

This example includes the elements of example 60, wherein in response to the device registration message, the CSM is further configured to cause the second client device to establish a secure communication session between the second client device and the synchronization server.

Example 62

This example includes the elements of example 61, wherein the CSM is configured to establish the secure communication session before registering the second client device, the second encrypted template, and {$SWK_2$}_$SWK_1$ with the synchronization server.

Example 63

This example includes the elements of any one of examples 60 to 62, wherein the CSM causes the second client device to initiate the secure communication session by transmitting a secure communications request to the synchronization server.

Example 64

This example includes the elements of example 63, wherein the secure communications request is configured to cause the synchronization server to transmit a server identification certificate to the second client device.

Example 65

This example includes the elements of example 64, wherein the server identification certificate includes at least one of information identifying the synchronization server and information about an entity providing the synchronization server.

Example 66

This example includes the elements of any one of examples 64 and 65, wherein the CSM is further configured to cause the second client device to verify that the synchronization server is authorized to perform at least one of device registration, template registration, template restoration, and template synchronization operations for client devices within the synchronization pool.

Example 67

This example includes the elements of any one of examples 64 to 66, wherein the server identification certificate is signed by the synchronization server with a digital signature, and the CSM is further configured to cause the second client device to validate the authenticity of the digital signature.

Example 68

This example includes the elements of any one of examples 61-67, wherein prior to establishing the secure communication session, the CSM is further configured to cause the second client device to verify the identity of the synchronization server using at least one of an enhanced privacy identification (EPID) protocol, a direct autonomous attestation protocol, a remote anonymous attestation protocol, and a signature and message authentication code (SIGMA) protocol.

Example 69

This example includes the elements of any one of examples 61-68, wherein the secure communication session is established using at least one shared session key (SSK).

Example 70

This example includes the elements of any one of examples 61-69, wherein registering the second client device includes transmitting a context message to the synchronization server within the secure communication session, the context message including second device identification indicia, the second device identification indicia including at least one of a measurement of the second protected environment, a hash of the second protected environment, a hardware identifier of the second client device, a protected environment identifier of the second protected environment, and the identity of an independent software vendor (ISV) that provisioned the second protected environment on the second client device.

Example 71

This example includes the elements of example 70, wherein the context message further includes a copy of the second encrypted template.

Example 72

This example includes the elements of one of examples 70 and 71, wherein the context message further includes a copy of $\{SWK_2\}\_SWK_1$.

Example 73

This example includes the elements of any one of examples 70-72, wherein the context message is configured to cause the synchronization server to establish a data structure for the synchronization pool and allocate the second encrypted template, $\{SWK_2\}\_SWK_1$, and the second device identification indicia within the data structure.

Example 74

This example includes the elements of any one of examples 70 to 73, wherein the device registration message is further configured to cause the second client device to encrypt $SWK_1$ with $SWK_2$ to produce a second encrypted key ($\{SWK_1\}\_SWK_2$).

Example 75

This example includes the elements of example 74, wherein the context message further includes a copy of $\{SWK_1\}\_SWK_2$.

Example 76

This example includes the elements of any one of examples 70 to 75, wherein the context message is configured to cause the synchronization server to store the second encrypted template, $\{SWK_1\}\_SWK_2$, and the second device identification indicia within the data structure for the synchronization pool.

Example 77

This example includes the elements of any one of examples 55 to 76, wherein the CSM is further configured to cause the second client device to transmit a restore templates request to the synchronization server, the restore templates request configured to cause the synchronization server to transmit the second encrypted template registered in association with the record of the second client device to the second client device.

Example 78

This example includes the elements of example 77, wherein the CSM causes the second client device to transmit the restore templates request in response to receiving a restore templates initiation message from the first device.

Example 79

This example includes the elements of any one of examples 77 and 78, wherein the CSM is further configured to cause the second client device to decrypt the second encrypted template received from the synchronization server using $SWK_2$.

Example 80

This example includes the elements of example 55, wherein the restore templates request configured to cause the synchronization server to transmit the second encrypted reference template registered in association with the record of the second client device to the first client device.

Example 81

This example includes the elements of example 79, wherein the CSM is further configured to cause the second client device to decrypt the second encrypted templates received from the synchronization server within the second protected environment to produce a restored template.

Example 82

This example includes the elements of example 81, wherein the CSM is further configured to cause the second client device to encrypt the restored template with a protected environment key specific to the second protected environment.

Example 83

This example includes the elements of example 81, wherein the CSM is further configured to cause the first client device to sign the restored template with a digital signature key.

Example 84

This example includes the elements of example 83, wherein the digital signature key is a private key specific to the second protected environment.

Example 85

This example includes the elements of example 84, wherein the private key is selected from the group consisting of an enhanced privacy identifier (EPID) private key, a private key used in Rivest Shamir Adlemen (RSA) encryption, a hash of the second protected environment, and combinations thereof.

Example 86

This example includes the elements of example 55, wherein the CSM is further configured to cause the second client device to transmit a sync templates request message to the synchronization server, the sync templates request message configured to cause the synchronization server to transmit at least one of the second encrypted template and a first encrypted template to client devices within the synchronization pool.

Example 87

This example includes the elements of example 86, wherein the client devices within the synchronization pool include the first client device and at least one second client device.

Example 88

This example includes the elements of any one of examples 86 and 87, wherein the sync templates request message includes device identification indicia for at least one of the first and second client devices.

Example 89

This example includes the elements of any one of examples 86 to 88, wherein the sync templates request message identifies the synchronization pool.

Example 90

This example includes the elements of any one of examples 86 to 89, wherein the sync templates request causes the synchronization server to transmit the first encrypted template to the second client device, wherein the first encrypted template is a template encrypted with a sync wrapping key ($SWK_1$) of the first client device, and the sync templates request message further causes the synchronization server to transmit a first template synchronization message including a copy of $SWK_1\_SWK_2$ to the second client device, wherein $SWK_1\_SWK_2$ is a copy of $SWK_1$ as encrypted by $SWK_2$.

Example 91

This example includes the elements of example 90, wherein the CSM further causes the second client device to decrypt $SWK_1\_SWK_2$ to obtain $SWK_1$ within the second protected environment, and to decrypt the first encrypted template with $SWK_1$ within the second protected environment.

Example 92

This example includes the elements of any one of examples 86-91, wherein the sync templates request message causes the synchronization server to transmit a second template synchronization message including a copy of $\{SWK2\}\_SWK_1$ to the first client device.

Example 93

This example includes the elements of example 92, wherein the sync templates request message further causes the synchronization server to transmit a copy of the second encrypted template to the first client device.

Example 94

In this example there is provided a synchronization server, including a processor, a memory, and a sync server module (SSM), wherein the SSM is configured to cause the synchronization server to perform the following operations including: register at least a first client device in association with a synchronization pool; and register at least a first encrypted template in association with a record of the first client device, wherein the first encrypted template is a template that has been encrypted with a first sync wrapping key ($SWK_1$) of the first client device.

Example 95

This example includes the elements of example 94, wherein the SSM is further configured to cause the synchronization server to: register at least a second client device in association with the synchronization pool; and register at least a second encrypted template in associate with a record of the second client device, wherein the second encrypted template is a template that has been encrypted with a second sync wrapping key ($SWK_2$) of the second client device.

Example 96

This example includes the elements of example 95, wherein the SSM registers at least one of the first client device, first encrypted template, second client device, and second encrypted template in response to at least one device registration message.

Example 97

This example includes the elements of example 96, wherein the at least one device registration message includes device identification indicia of at least one of the first and second client devices.

Example 98

This example includes the elements of Example 70: This example includes the elements of example 97, wherein the device identification indicia includes first identification indicia of the first client device, the first identification indicia including at least one of a measurement of a first protected environment within the first client device, a hash of the first protected environment, a hardware identifier of the first client device, a protected environment identifier of the first protected environment, and the identity of an independent software vendor (ISV) that provisioned the first protected environment on the first client device.

Example 99

This example includes the elements of at least one of examples 97 and 98, wherein the device identification indicia includes second device identification indicia of the second client device, wherein the second device identification indicia includes at least one of a measurement of a second protected environment within the second client device, a hash of the second protected environment, a hardware identifier of the second client device, a protected environment identifier of the second protected environment, and the identity of an independent software vendor (ISV) that provisioned the second protected environment on the second client device.

Example 100

This example includes the elements of any one of examples 95-99, wherein the SSM is further configured to: register a copy of an encrypted sync wrapping key ($\{SWK_2\}\_SWK_1$) in association with the synchronization pool, wherein $\{SWK_2\}\_SWK_1$ is a copy of $SWK_2$ as encrypted by $SWK_1$.

Example 101

This example includes the elements of any one of examples 94 to 100, wherein the SSM is further configured to establish a first secure communication session between the first client device and the synchronization server.

Example 102

This example includes the elements of example 101, wherein the SSM is configured to establish the first secure communication session before registering the first client device, the first encrypted template, and $\{SWK_2\}\_SWK_1$ with the synchronization server.

Example 103

This example includes the elements of any one of examples 101 and 102, wherein the SSM causes the synchronization server to initiate the first secure communication session in response to receiving a first secure communications request from the first client device.

Example 104

This example includes the elements of example 103, wherein the SSM causes the synchronization server to transmit a server identification certificate to the first client device in response to the first secure communications request.

Example 105

This example includes the elements of example 104, wherein the server identification certificate includes at least one of information identifying the synchronization server and information about an entity providing the synchronization server.

Example 106

This example includes the elements of example 105, wherein the SSM is further configured to cause the synchronization server to verify the authenticity of the first client device before the first secure communication session is established.

Example 107

This example includes the elements of example 106, wherein the SSM causes the synchronization server to verify the authenticity of the first client device using at least one of an enhanced privacy identification (EPID) protocol, a direct autonomous attestation protocol, a remote anonymous attestation protocol, and a signature and message authentication code (SIGMA) protocol.

Example 108

This example includes the elements of any one of examples 104 to 107, wherein the CSM causes the synchronization server to sign the server identification certificate with a digital signature.

Example 109

This example includes the elements of any one of examples 101-108, wherein the SSM causes the synchronization server to establish the first secure communication session using at least one shared session key (SSK).

Example 110

This example includes the elements of any one of examples 101-109, wherein the CSM causes the synchronization server to register the first client device in response to a receiving a first context message from the first client device within the first secure communication session, the first context message including first device identification indicia, the first device identification indicia including at least one of a measurement of a first protected environment within the first client device, a hash of the first protected environment, a hardware identifier of the first client device, a protected environment identifier of the first protected environment, and the identity of an independent software vendor (ISV) that provisioned the first protected environment on the first client device.

Example 111

This example includes the elements of example 110, wherein the first context message further includes a copy of $\{SWK_2\}\_SWK_1$, wherein $\{SWK_2\}\_SWK_1$ is a copy of $SWK_2$ as encrypted by $SWK_1$.

Example 112

This example includes the elements of any one of examples 110 and 111, wherein in response to the first context message, the synchronization server establishes a data structure for the synchronization pool and allocates the first encrypted template, $\{SWK_2\}\_SWK_1$, and the first device identification indicia within the data structure.

Example 113

This example includes the elements of example 95, wherein the SSM is further configured to register a second encrypted key ($\{SWK_1\}\_SWK_2$) in association with the second client device in the synchronization pool, wherein $\{SWK_1\}\_SWK_2$ is a copy of $SWK_1$ as encrypted by $SWK_2$.

Example 114

This example includes the elements of example 113, wherein the SSM is further configured to establish a second secure communication session between the second client device and the synchronization server.

Example 115

This example includes the elements of example 114, wherein the SSM is configured to initiate the second secure communication session in response to receiving a second secure communication request.

Example 116

This example includes the elements of any one of examples 114 and 115, wherein the SSM is further configured to verify the identity of the second client device prior to establishing the second communication session.

Example 117

This example includes the elements of example 116, wherein the SSM verifies the authenticity of the second client device using at least one of an enhanced privacy identification (EPID) protocol, a direct autonomous attestation protocol, a remote anonymous attestation protocol, and a signature and message authentication code (SIGMA) protocol.

Example 118

This example includes the elements of any one of examples 114 to 117, wherein the SSM causes the synchronization server to establish the second secure communication session based on the use of at least one shared session key (SSK).

Example 119

This example includes the elements of example 95, wherein the SSM is further configured to cause the synchronization server to transmit the first encrypted template registered in association with the record of the first client device to the first client device in response to a restore templates request.

Example 120

This example includes the elements of example 95, wherein the SSM is further configured to cause the synchronization server to transmit the second encrypted template associated with the record of the second client device to the second client device in response to a restore templates request.

Example 121

This example includes the elements of any one of examples 119 and 120, wherein in response to receiving a sync templates request the SSM is configured to cause the synchronization server to transmit at least one of the first encrypted template and the second encrypted template to client devices within the synchronization pool.

Example 122

This example includes the elements of example 121, wherein the client devices within the synchronization pool include the first client device and the second client device.

Example 123

This example includes the elements of example 121, wherein the SSM causes the synchronization server to analyze the sync templates request for device identification indicia of client devices within the synchronization pool, and to transmit at least one of the first and second encrypted templates to devices identified by the device identification indicia.

Example 124

This example includes the elements of any one of examples 121 to 123, wherein the SSM causes the synchronization server to transmit the first encrypted template to the second client device as well as a copy of $\{SWK_1\}\_SWK_2$, where $\{SWK_1\}\_SWK_2$ is a copy of $SWK_1$ as encrypted by $SWK_2$.

Example 125

This example includes the elements of any one of examples 121 to 124, wherein the SSM causes the synchronization server to transmit the second encrypted template to the first device as well as a copy of $\{SWK_2\}\_SWK_1$, where $\{SWK_2\}\_SWK_1$ is a copy of $SWK_2$ as encrypted by $SWK_1$.

Example 126

In this example there is provided a method, including: registering a first client device with a synchronization server in association with a synchronization pool, the first client device including a first protected environment: generating a first encrypted template by encrypting a first template with a first sync wrapping key ($SWK_1$) within the first protected environment; and registering the first encrypted template with the synchronization server in association with a record of the first client device produced by the synchronization server.

Example 127

This example includes the elements of example 126, wherein the first protected environment is selected from the group consisting of a trusted execution environment (TEE), a memory enclave, or a combination thereof.

Example 128

This example includes the elements of example 127, and further includes generating $SWK_1$ within the first protected environment.

Example 129

This example includes the elements of Example 121: This example includes the elements of example 126, and further includes transmitting a device registration message including a copy of $SWK_1$ from the first client device to a second client device within the synchronization pool.

Example 130

This example includes the elements of example 129, wherein the device registration message further includes first device identification indicia of the first client device.

Example 131

This example includes the elements of example 130, wherein the first device identification indicia includes at least one of a measurement of the first protected environment, a hash of the first protected environment, a hardware identifier of the first client device, a protected environment identifier of the first protected environment, and the identity of an independent software vendor (ISV) that provisioned the first protected environment on the first client device.

Example 132

This example includes the elements of any one of examples 129-131, further including encrypting at least a portion of the device registration message with the first client device before transmission to the second client device.

Example 133

This example includes the elements of any one of examples 129-132, and further includes: generating, in response to the device registration message, a second sync wrapping key ($SWK_2$) with the second client device; and transmitting $SWK_2$ from the second client device to the first client device.

Example 134

This example includes the elements of any one of examples 129 to 133, and further includes: transmitting, in response to the device registration message, second device identification indicia of the second client device from the second client device to the first client device.

Example 135

This example includes the elements of example 134, wherein the second device identification indicia includes at least one of a measurement of a second protected environment within the second client device, a hash of the second protected environment, a hardware identifier of the second client device, a protected environment identifier of the second protected environment, and the identity of an independent software vendor (ISV) that provisioned the second protected environment on the second client device.

Example 136

This example includes the elements of any one of examples 133 to 135, and further includes, in response to receiving $SWK_2$ from the second client device: encrypting $SWK_2$ with $SWK_1$ within the first protected environment to produce an encrypted sync wrapping key ($\{SWK_2\}\_SWK_1$); and registering $\{SWK_2\}\_SWK_1$ with the synchronization server in association with the synchronization pool.

Example 137

This example includes the elements of example 136, and further includes establishing a first secure communication session between the first client device and the synchronization server.

Example 138

This example includes the elements of example 137, wherein the first secure communication session is established before registering the first client device, the first encrypted template, and $\{SWK_2\}\_SWK_1$ with the synchronization server.

Example 139

This example includes the elements of any one of examples 136 and 137, and further includes transmitting a first secure communications request to the synchronization server to initiate the first secure communication session.

Example 140

This example includes the elements of example 139, wherein the first secure communications request is configured to cause the synchronization server to transmit a server identification certificate to the first client device.

Example 141

This example includes the elements of example 140, wherein the server identification certificate includes at least one of information identifying the synchronization server and information about an entity providing the synchronization server.

Example 142

This example includes the elements of any one of examples 150 and 141, and further includes: verifying with the first client device that the synchronization server is authorized to perform at least one of device registration, template registration, template restoration, and template synchronization operations for client devices within the synchronization pool.

Example 143

This example includes the elements of examples 141 and 142, wherein the server identification certificate is signed by the synchronization server with a digital signature, and the method further includes verifying the authenticity of the digital signature with the first client device.

Example 144

This example includes the elements of any one of examples 137 to 143, and further includes using the first client device to verify the identity of the synchronization server using at least one of an enhanced privacy identification (EPID) protocol, a direct autonomous attestation protocol, a remote anonymous attestation protocol, and a signature and message authentication code (SIGMA) protocol prior to establishing the first secure communication session.

Example 145

This example includes the elements of any one of examples 136 to 144, and further includes using a shared session key (SSK) to establish the first secure communication session.

Example 146

This example includes the elements of any one of examples 136 to 145, wherein registering the first client device includes transmitting a first context message to the synchronization server within the first secure communication session, the first context message including first device identification indicia, the first device identification indicia including at least one of a measurement of the first protected environment, a hash of the first protected environment, a hardware identifier of the first client device, a protected environment identifier of the first protected environment, and the identity of an independent software vendor (ISV) that provisioned the first protected environment on the first client device.

Example 147

This example includes the elements of example 146, wherein the first context message further includes a copy of the first encrypted template.

Example 148

This example includes the elements of any one of examples 145 to 147, wherein the first context message further includes a copy of $\{SWK_2\}\_SWK_1$.

Example 149

This example includes the elements of any one of examples 135 to 138, and further includes: in response to the first context message, establishing with the synchronization server a data structure for the synchronization pool; and allocating the first encrypted template, $\{SWK_2\}\_SWK_1$, and the first device identification indicia within the data structure.

Example 150

This example includes the elements of example 149, and further includes: in response to the first device registration message, encrypting $SWK_1$ with $SWK_2$ with the second client device to produce a second encrypted key ($\{SWK_1\}\_SWK_2$).

Example 151

This example includes the elements of any one of examples 149 and 150, and further includes: in response to the first device registration message, transmitting a second device registration message from the first client device to the second client device; and establishing, in response to the second device registration message, a second secure communication session between the second client device and the synchronization server.

Example 152

This example includes the elements of example 151, wherein establishing the second secure communication session includes transmitting a second secure communications request from the second client device to the synchronization server.

Example 153

This example includes the elements of and one of examples 151 and 152, further including: in response to the second device registration message, verifying with the second client device that the synchronization server is authorized to perform at least one of device registration, template registration, template restoration, and template synchronization operations for client devices within the synchronization pool.

Example 154

This example includes the elements of any one of examples 151 to 153, wherein the verifying with the second client device is performed prior to establishing the second secure communication session, using at least one of an enhanced privacy identification (EPID) protocol, a direct autonomous attestation protocol, a remote anonymous attestation protocol, and a signature and message authentication code (SIGMA) protocol.

Example 155

This example includes the elements of any one of examples 152 to 154, and further includes establishing the second secure communication session using at least one shared session key (SSK).

Example 156

This example includes the elements of any one of examples 152 to 155, wherein the second client device includes a second protected environment including a second template, and the method further includes: registering the second client device with the synchronization server in association with the synchronization pool; encrypting, within the second protected environment, the second template with $SWK_2$ to produce second encrypted template; and registering the second encrypted template with the synchronization server in association with the synchronization pool.

Example 157

This example includes the elements of example 156, and further includes: in response to the second device registration message, transmitting a second context message from the second client device to the synchronization server within the second secure communication session, the second context message including second device identification indicia, the second device identification indicia including at least one of a measurement of the second protected environment, a hash of the second protected environment, a hardware identifier of the second client device, a protected environment identifier of the second protected environment, and the identity of an independent software vendor (ISV) that provisioned the second protected environment on the second client device.

Example 158

This example includes the elements of example 157, wherein the second context message further includes a copy of the second encrypted template.

Example 159

This example includes the elements of any one of examples 157 and 158, wherein the second context message further includes a copy of $\{SWK_1\}\_SWK_2$.

Example 160

This example includes the elements of any one of examples 158 and 159, and further includes: in response to the second context message, storing the second encrypted template, $\{SWK_1\}\_SWK_2$, and the second device identification indicia within the data structure for the synchronization pool.

Example 161

This example includes the elements of example 126, and further includes: transmitting a restore templates request to the synchronization server from the first client device; and in response to the restore templates request, transmitting the first encrypted template registered in association with the record of the first client device from the synchronization server to the first client device.

Example 162

This example includes the elements of example 161, and further includes decrypting with the first client device a first encrypted template received from the synchronization server using $SWK_1$, so as to obtain a restored template within the first protected environment.

Example 163

This example includes the elements of example 162, and further includes: registering a second encrypted template with the synchronization server in association with a record of a second client device; transmitting a restore templates request from the second client device to the synchronization server; and in response to the restore template request, transmitting a copy of the second encrypted template from the synchronization server to the second client device.

Example 164

This example includes the elements of example 163, and further includes: in response to the restore templates request, transmitting a copy of the second encrypted template to the first client device; and transmitting the second encrypted template from the first client device to the second client device.

Example 165

This example includes the elements of example 162, and further includes decrypting the first encrypted template received from the synchronization server within the first protected environment to produce a restored template.

Example 166

This example includes the elements of example 165, and further includes encrypting the restored template with a protected environment key specific to the protected environment.

Example 167

This example includes the elements of example 165, and further includes signing the restored template with a digital signature key.

Example 168

This example includes the elements of example 167, wherein the digital signature key is a private key specific to the protected environment.

Example 169

This example includes the elements of example 168, wherein the private key is selected from the group consisting of an enhanced privacy identifier (EPID) private key, a private key used in Rivest Shamir Adlemen (RSA) encryption, a hash of the protected environment, and combinations thereof.

Example 170

This example includes the elements of example 162, and further includes: transmitting a sync templates request message from the first client device to the synchronization server, and in response to the sync templates request message, transmitting at least one of the first encrypted template and a second encrypted template from the synchronization server to client devices within the synchronization pool.

Example 171

This example includes the elements of example 170, wherein the client devices within the synchronization pool include the first client device and at least one second client device.

Example 172

This example includes the elements of any one of examples 170 and 171, wherein the sync templates request message includes device identification indicia for at least one of the first and second client devices.

Example 173

This example includes the elements of any one of examples 170 to 172, wherein the sync templates request message identifies the synchronization pool.

Example 174

This example includes the elements of any one of examples 171 to 173, wherein the second encrypted template is a template encrypted with a sync wrapping key ($SWK_2$) of the second client device, and the method further includes transmitting a first template synchronization message from the synchronization server to the first client device, the first template synchronization message including a copy of $SWK_2\_SWK_1$ to the first client device, wherein $SWK_2\_SWK_1$ is a copy of $SWK_2$ as encrypted by $SWK_1$.

Example 175

This example includes the elements of example 174, and further includes: in response to the sync templates request, transmitting a copy of the second encrypted template from the synchronization server to the first client device.

Example 176

This example includes the elements of any one of examples 174 and 175, and further includes: decrypting $SWK_2\_SWK_1$ to obtain $SWK_2$ within the first protected environment; and decrypting the second encrypted template with $SWK_2$ within the protected environment.

Example 177

This example includes the elements of any one of examples 170 to 176, and further includes: in response to the sync templates request message, transmitting a copy of $\{SWK_1\}\_SWK_2$ from the synchronization server to the second client device, wherein $\{SWK_1\}\_SWK_2$ is a copy of $SWK_1$ as encrypted by the second client device's sync wrapping key, $SWK_2$.

Example 178

This example includes the elements of example 177, and further includes, in response to the sync templates request message, transmitting a copy of the first encrypted template from the synchronization server to the second client device.

Example 179

This example includes the elements of example 178, wherein the second client device includes a second protected environment, and the method further includes decrypting $SWK_1\_SWK_2$ to obtain $SWK_1$ within the second protected environment, and decrypting the first encrypted template with $SWK_1$.

Example 180

This example includes the elements of example 59, wherein the second device identification indicia includes at least one of a measurement of a second protected environment within the second client device, a hash of the second protected environment, a hardware identifier of the second client device, a protected environment identifier of second first protected environment, and the identity of an independent software vendor (ISV) that provisioned the second protected environment on the second client device.

Example 181

In this example there is provided a system including at least one device arranged to perform the method of any one of examples 126 to 180.

Example 182

In this example there is provided a device including means to perform the method of any one of examples 126 to 180.

Example 183

In this example there is provided at least one machine readable medium including a plurality of instructions that, in response to being executed on a computing device, cause the computing device to perform the method according to any one of examples 126 to 180.

What is claimed is:

1. A first client device, comprising:
a hardware processor, a memory, a first protected environment having a first template including biometric reference information of a user stored therein, and a client synchronization module (CSM) configured to cause the first client device to perform the following operations comprising:
register said first client device with a synchronization server in association with a synchronization pool including a plurality of client devices to which said first template can be sent;
cause said first client device to encrypt said first template with a first sync wrapping key (SWK1) within said first protected environment to produce a first encrypted template;
register said first encrypted template with said synchronization server in association with a record of said first client device produced by said synchronization server; and send a request message to said synchronization server to cause said synchronization server to send said first encrypted template to a second client device included in the synchronization pool.

2. The first client device of claim 1, wherein said CSM is further configured to cause said first client device to transmit a first device registration message comprising a copy of $SWK_1$ and first device identification indicia of said first client device to said second client device within said synchronization pool, said first device identification indicia comprising at least one of a measurement of said first protected environment, a hash of said first protected environment, a hardware identifier of said first client device, a protected environment identifier of said first protected environment, and the identity of an independent software vendor (ISV) that provisioned the first protected environment on the first client device.

3. The first client device of claim 2, wherein:
said first device registration message is configured to cause said second client device to generate a second sync wrapping key ($SWK_2$) and transmit $SWK_2$ to said first client device; and
in response to receiving $SWK_2$ from the second client device, said CSM is further configured to:
cause said first client device to encrypt $SWK_2$ with $SWK_1$ within said first protected environment to produce an encrypted sync wrapping key ($\{SWK_2\}\_SWK_1$); and
register $\{SWK_2\}\_SWK_1$ with said synchronization server in association with said synchronization pool.

4. The first client device of claim 3, wherein said CSM is further configured to cause said first client device to establish a first secure communication session between said first client device and said synchronization server by performing the following operations comprising:
initiating a first secure communication session by transmitting a first secure communications request to said synchronization server, said server identification certificate comprising at least one of information identifying said synchronization server and information about an entity providing said synchronization server.

5. The first client device of claim 4, wherein registering said first client device comprises transmitting a first context message to said synchronization server within said first secure communication session, said first context message comprising:
first device identification indicia comprising at least one of a measurement of said first protected environment, a hash of said first protected environment, a hardware identifier of said first client device, a protected environment identifier of said first protected environment, and the identity of an independent software vendor (ISV) that provisioned the first protected environment on the first client device;
a copy of said first encrypted template; and
a copy of $\{SWK_2\}\_SWK_1$.

6. The first client device of claim 2, wherein said first device registration message is further configured to cause said second client device to encrypt $SWK_1$ with $SWK_2$ to produce a second encrypted key ($\{SWK_1\}\_SWK_2$), and said CSM is further configured to cause said first client device to transmit a second device registration message to said second client device, wherein the second device registration message is configured to cause said second client device to:
establish a second secure communication session between said second client device and said synchronization server; and
verify the identity of said synchronization server prior to establishing said second secure communication session, using at least one of an enhanced privacy identification (EPID) protocol, a direct autonomous attestation protocol, a remote anonymous attestation protocol, and a signature and message authentication code (SIGMA) protocol.

7. The first client device of claim 6, wherein said second client device comprises a second protected environment comprising a second template, and said second device registration message is further configured to cause said second client device to:
register with said synchronization server in association with said synchronization pool;
encrypt, within said second protected environment, said second template with $SWK_2$ to produce a second encrypted template; and
register said second encrypted template with said synchronization server in association with said synchronization pool.

8. The first client device of claim 7, wherein said second device registration message is further configured to cause said second client device to send a second context message to said synchronization server, said second context message configured to cause said synchronization server to store said second encrypted template, $\{SWK_1\}\_SWK_2$, and second device identification indicia of said second device within said data structure for said synchronization pool.

9. The first client device of claim 1, wherein said CSM is further configured to cause said first client device to:
transmit a restore templates request to said synchronization server, said restore templates request configured to cause said synchronization server to transmit the first encrypted template registered in association with the record of said first client device to said first client device; and
decrypt the first encrypted template received from the synchronization server using $SWK_1$ within said first protected environment to produce a restored template.

10. The first client device of claim 1, wherein said CSM is further configured to cause said first client device to transmit a sync templates request message to said synchronization server, said sync templates request message configured to cause said synchronization server to transmit at least one of said first encrypted template and a second encrypted template to client devices within said synchronization pool, wherein said second encrypted template is a template encrypted with a sync wrapping key ($SWK_2$) of said second client device, and said sync templates request message further causes said synchronization server to transmit a first template synchronization message comprising a copy of $SWK_2$-$SWK_1$ to said first client device, wherein $SWK_2$-$SWK_1$ is a copy of $SWK_2$ as encrypted by $SWK_1$.

11. A method, comprising:
registering a first client device with a synchronization server in association with a synchronization pool including a plurality of client devices to which one or more templates can be sent, the first client device comprising a first protected environment;
generating a first encrypted template by encrypting a first template with a first sync wrapping key ($SWK_1$) within said first protected environment, the first template including biometric reference information of a user;
registering said first encrypted template with said synchronization server in association with a record of said first client device produced by said synchronization server; and
sending a request message to said synchronization server to cause said synchronization server to send said first encrypted template to a second client device included in the synchronization pool.

12. The method of claim 11, further comprising:
transmitting a device registration message to said second client device within said synchronization pool, said device registration message comprising a copy of $SWK_1$ and first device identification indicia of said first client device;
generating, in response to said device registration message, a second sync wrapping key ($SWK_2$) within said second client device;
transmitting $SWK_2$ from said second client device to said first client device; and
transmitting, in response to said device registration message, second device identification indicia of said second client device from said second client device to said first client device.

13. The method of claim 12, further comprising, in response to receiving $SWK_2$ from the second client device:
encrypting $SWK_2$ with $SWK_1$ within said first protected environment to produce an encrypted sync wrapping key (\{$SWK_2$\}_$SWK_1$); and
registering \{$SWK_2$\}_$SWK_1$ with said synchronization server in association with said synchronization pool.

14. The method of claim 13, further comprising:
establishing a first secure communication session between said first client device and said synchronization server;
transmitting a copy of said first encrypted template and \{$SWK_2$\}_$SWK_1$ to said synchronization server over said first secure communication session;
establishing with said synchronization server a data structure for said synchronization pool; and
allocating said first encrypted template, \{$SWK_2$\}_$SWK_1$, and said first device identification indicia within said data structure.

15. The method of claim 12, wherein said second client device comprises a second protected environment comprising a second template, the method further comprising:
registering said second client device with said synchronization server in association with said synchronization pool;
encrypting, within said second protected environment, said second template with $SWK_2$ to produce a second encrypted template;
registering said second encrypted template with said synchronization server in association with said synchronization pool; and
transmitting a copy of \{$SWK_1$\}_$SWK_2$ to the synchronization server, wherein \{$SWK_1$)\}_$SWK_2$ is a copy of $SWK_1$ as encrypted by $SWK_2$.

16. The method of claim 15, further comprising:
transmitting a restore templates request to said synchronization server from said first client device;
in response to said restore templates request, transmitting the first encrypted template registered in association with the record of said first client device from said synchronization server to said first client device; and
decrypting with said first client device the first encrypted template received from the synchronization server using $SWK_1$, so as to obtain a restored template within said first protected environment.

17. The method of claim 15, further comprising:
transmitting a sync templates request message from said first client device to said synchronization server; and
in response to said sync templates request message, transmitting at least one of said first encrypted template and a second encrypted template from said synchronization server to client devices within said synchronization pool.

18. At least one non-transitory machine readable storage medium having stored thereon, individually or in combination, instructions that when executed by at least one processor result in the following operations comprising:
registering a first client device with a synchronization server in association with a synchronization pool including a plurality of client devices to which one or more templates can be sent, the first client device comprising a first protected environment;
generating a first encrypted template by encrypting a first template with a first sync wrapping key ($SWK_1$) within said first protected environment, the first template including biometric reference information of a user;
registering said first encrypted template with said synchronization server in association with a record of said first client device produced by said synchronization server; and
sending a request message to said synchronization server to cause said synchronization server to send said first encrypted template to a second client device included in the synchronization pool.

19. The at least one non-transitory computer readable storage medium of claim 18, wherein the instructions when executed further result in the following operations comprising:
transmitting a device registration message to said second client device within said synchronization pool, said device registration message comprising a copy of $SWK_1$ and first device identification indicia of said first client device;
generating, in response to said device registration message, a second sync wrapping key ($SWK_2$) within said second client device;

transmitting $SWK_2$ from said second client device to said first client device; and transmitting, in response to said device registration message, second device identification indicia of said second client device from said second client device to said first client device.

20. The at least one non-transitory computer readable storage medium of claim 19, wherein the instructions when executed further result in the following operations comprising, in response to receiving $SWK_2$ from the second client device:

encrypting $SWK_2$ with $SWK_1$ within said first protected environment to produce an encrypted sync wrapping key ($\{SWK_2\}\_SWK_1$); and registering $\{SWK_2\}\_SWK_1$ with said synchronization server in association with said synchronization pool.

21. The at least one non-transitory computer readable storage medium of claim 20, wherein the instructions when executed further result in the following operations comprising:

establishing a first secure communication session between said first client device and said synchronization server;

transmitting a copy of said first encrypted template and $\{SWK_2\}\_SWK_1$ to said synchronization server over said first secure communication session;

establishing with said synchronization server a data structure for said synchronization pool; and allocating said first encrypted template, $\{SWK_2\}\_SWK_1$, and said first device identification indicia within said data structure.

22. The at least one non-transitory computer readable storage medium of claim 19, wherein said second client device comprises a second protected environment comprising a second template, and the instructions when executed further result in the following operations comprising:

registering said second client device with said synchronization server in association with said synchronization pool;

encrypting, within said second protected environment, said second template with $SWK_2$ to produce a second encrypted template; and registering said second encrypted template with said synchronization server in association with said synchronization pool; and transmitting a copy of $\{SWK_1\}\_SWK_2$ to the synchronization server, wherein $\{SWK_1\}$ $SWK_2$ is a copy of $SWK_1$ as encrypted by $SWK_2$.

23. The at least one non-transitory computer readable storage medium of claim 22, wherein the instructions when executed further result in the following operations comprising:

transmitting a restore templates request to said synchronization server from said first client device;

in response to said restore templates request, transmitting the first encrypted template registered in association with the record of said first client device from said synchronization server to said first client device; and decrypting with said first client device the first encrypted template received from the synchronization server using $SWK_1$, so as to obtain a restored template within said first protected environment.

24. The at least one non-transitory computer readable storage medium of claim 23, wherein the instructions when executed further result in the following operations comprising:

transmitting a sync templates request message from said first client device to said synchronization server; and in response to said sync templates request message, transmitting at least one of said first encrypted template and a second encrypted template from said synchronization server to client devices within said synchronization pool.

* * * * *